(12) United States Patent
Gillian et al.

(10) Patent No.: US 12,354,409 B2
(45) Date of Patent: Jul. 8, 2025

(54) DYNAMIC ANIMATION OF HUMAN MOTION USING WEARABLE SENSORS AND MACHINE LEARNING

(71) Applicant: Google LLC, Mountain View, CA (US)

(72) Inventors: Nicholas Gillian, Palo Alto, CA (US); Daniel Lee Giles, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 669 days.

(21) Appl. No.: 17/701,338

(22) Filed: Mar. 22, 2022

(65) Prior Publication Data

US 2022/0301353 A1    Sep. 22, 2022

Related U.S. Application Data

(60) Provisional application No. 63/164,143, filed on Mar. 22, 2021.

(51) Int. Cl.
| | |
|---|---|
| *G06V 40/20* | (2022.01) |
| *G06N 20/20* | (2019.01) |
| *G06T 13/40* | (2011.01) |

(52) U.S. Cl.
CPC ............. *G06V 40/25* (2022.01); *G06N 20/20* (2019.01); *G06T 13/40* (2013.01)

(58) Field of Classification Search
CPC ......... G06V 40/25; G06N 20/20; G06T 13/40
See application file for complete search history.

(56) References Cited

U.S. PATENT DOCUMENTS

| | | | |
|---|---|---|---|
| 9,898,849 B2* | 2/2018 | Du | ........................ G06V 40/171 |
| 10,108,984 B2 | 10/2018 | Baldwin et al. | |

(Continued)

FOREIGN PATENT DOCUMENTS

| | | | |
|---|---|---|---|
| CN | 111753801 A | * | 10/2020 |
| KR | 10-2019-0034381 | | 4/2019 |
| WO | WO 2018125347 | | 7/2018 |
| WO | WO 2018236702 | | 12/2018 |

OTHER PUBLICATIONS

Eshratifar et al, "JointDNN: An Efficient Training and Inference Engine for Intelligent Mobile Cloud Computing Services", arXiv:1801v2, Feb. 4, 2020, 12 pages.

(Continued)

*Primary Examiner* — Pinalben Patel
(74) *Attorney, Agent, or Firm* — DORITY & MANNING P.A.

(57) ABSTRACT

A system for motion capture of human body movements includes sensor nodes configured for coupling to respective portions of a human subject. Each sensor node generates inertial sensor data as the human subject engages in a physical activity session and processes the inertial sensor data according to a first machine-learned model to generate a set of local motion determinations. One or more computing devices receive the sets of local determinations and process them according to a second machine-learned model to generate a body motion profile. The computing device(s) provide an animated display of an avatar moving according to the body motion profile and generate training data based on input received from a viewer in response to the animated display. The computing device(s) modify at least one of the first machine-learned model or the second machine-learned model based at least in part on the training data.

17 Claims, 12 Drawing Sheets

(56) References Cited

U.S. PATENT DOCUMENTS

| | | | | |
|---|---|---|---|---|
| 2010/0201693 | A1* | 8/2010 | Caplette | G10H 1/368 345/474 |
| 2011/0304629 | A1* | 12/2011 | Winchester | G06T 13/40 345/473 |
| 2015/0151160 | A1 | 6/2015 | Balakrishnan et al. | |
| 2016/0026252 | A1 | 1/2016 | McCoy et al. | |
| 2016/0098089 | A1 | 4/2016 | Pouprev | |
| 2018/0053056 | A1 | 2/2018 | Rabinovich et al. | |
| 2018/0088786 | A1 | 3/2018 | Abzarian et al. | |
| 2018/0268589 | A1* | 9/2018 | Grant | G06F 3/017 |
| 2018/0285767 | A1* | 10/2018 | Chew | G06N 20/00 |
| 2019/0042955 | A1 | 2/2019 | Cahill et al. | |
| 2020/0126284 | A1* | 4/2020 | Garofalo | G16H 40/67 |
| 2020/0311546 | A1 | 10/2020 | Lee et al. | |
| 2020/0314022 | A1 | 10/2020 | Vasseur et al. | |
| 2020/0320416 | A1 | 10/2020 | Gillian et al. | |
| 2020/0341542 | A1* | 10/2020 | Kur | G06F 3/012 |

OTHER PUBLICATIONS

Li et al, "Edge Intelligence: On-Demand Deep Learning Model Co-Inference with Device-Edge Synergy", arXiv:1806v4, Dec. 27, 2018, 10 pages.

Li et al., "Jalad: Joint Accuracy-and Latency-Aware Deep Structure Decoupling for Edge-Cloud Execution.", arXiv:1812.10027v1, Dec. 25, 2018, 8 pages.

Teerapittayanon et al, "BranchyNet: Fast Inference via Early Exiting from Deep Neural Networks", arXiv:1709.01686v1, Sep. 6, 2017, 7 pages.

Teerapittayanon et al., "Distributed Deep Neural Networks over the Cloud, the Edge and End Devices", 2017 Institute of Electrical and Electronics Engineers International Conference on Distributed Computing Systems, Jun. 5-8, 2017, Atlanta, Georgia, United States, pp. 328-339.

* cited by examiner

US 12,354,409 B2

DYNAMIC ANIMATION OF HUMAN MOTION USING WEARABLE SENSORS AND MACHINE LEARNING

RELATED APPLICATIONS

The present application claims priority to U.S. Provisional Application No. 63/164,143, filed Mar. 22, 2021, which is incorporated by reference herein in its entirety.

FIELD

The present disclosure relates generally to wearable devices and machine-learning techniques for rendering animations based on detected movements of human subjects.

BACKGROUND

Detecting the movement of human subjects using wearables and other devices that may include computing devices with limited computational resources (e.g., processing capabilities, memory, etc.) can present a number of unique considerations. Machine-learned models are often used as part of gesture detection and movement recognition processes that are based on input sensor data. Sensor data such as touch data generated in response to touch input, or motion data generated in response to user motion, can be input to one or more machine-learned models. The machine-learned models can be trained to generate one or more inferences based on the input sensor data. These inferences can include detections, classifications, and/or predictions of gestures and/or movements. By way of example, a machine-learned model may be used to determine if input sensor data corresponds to a trick or movement associated with a particular physical activity.

Traditionally, computing systems have been pre-configured to detect specific activities, motions, and/or interactions that product designers determine a product such as a wearable device should be able to detect. For example, a computing system may be pre-configured to detect a number of movements in response to human motion. The predefined movements can be defined (e.g., by a product designer) and then one or more algorithms can be designed (e.g., by an engineering team) that are capable of recognizing the predefined movements. Often, accurate tracking of human movements requires specific hardware for a particular activity. Moreover, even if the movement of a human subject can be accurately tracked, the resulting data is often meaningless. For example, the system may generate a set of time series signals which may be of little interest to the average user. As such, it can be difficult to present sensor data recorded during a physical activity in a meaningful way.

SUMMARY

Aspects and advantages of embodiments of the present disclosure will be set forth in part in the following description, or may be learned from the description, or may be learned through practice of the embodiments.

According to one example aspect of the present disclosure, there is provided a method for motion capture of human body movements. The method includes obtaining, at each of a plurality of sensor nodes coupled to respective portions of a human subject, inertial sensor data as the human subject engages in a physical activity session, each sensor node comprising at least one inertial measurement sensor, at least one processor, and at least one memory. The method includes processing, at each of the sensor nodes, the inertial sensor data according to a first machine-learned model to generate from the inertial sensor data a set of local motion determinations for animation generation after completion of the physical activity session. The method includes receiving, at one or more computing devices from each of the plurality of sensor nodes, the set of local motion determinations identified for animation generation. The method includes processing, at the one or more computing devices, the set of local motion determinations from each of the plurality of sensor nodes according to a second machine-learned model to generate a body motion profile corresponding to the physical activity session. The method includes providing, by the one or more computing devices for display to at least one viewer, an animated display of an avatar moving according to the body motion profile. The method includes generating, by the one or more computing devices, training data based at least in part on input received from at least one viewer in response to viewing the animated display. The method incudes modifying at least one of the first machine-learned model or the second machine-learned model based at least in part on the training data.

Another example aspect of the present disclosure is directed to a system for motion capture of human body movements. The system includes a plurality of sensor nodes configured for coupling to respective portions of a human subject. Each sensor node includes at least one processor, at least one memory, and at least one inertial measurement sensor configured to generate inertial sensor data as the human subject engages in a physical activity session. The at least one processor at each sensor node is configured to process the inertial sensor data according to a first machine-learned model to generate from the inertial sensor data a set of local motion determinations for animation generation after completion of the physical activity session. The system includes one or more computing devices configured to receive, from each of the plurality of sensor nodes, the set of local motion determinations identified for animation generation, process the set of local motion determinations from each of the plurality of sensor nodes according to a second machine-learned model to generate a body motion profile corresponding to the physical activity session, provide for display to at least one viewer an animated display of an avatar moving according to the body motion profile, generate training data based at least in part on input received from at least one viewer in response to viewing the animated display, and modify at least one of the first machine-learned model or the second machine-learned model based at least in part on the training data.

Yet another example aspect of the present disclosure is directed to one or more non-transitory computer-readable media comprising instructions that when executed by one or more computing devices cause the one or more computing devices to perform operations that include obtaining, at each of a plurality of sensor nodes coupled to respective portions of a human subject, inertial sensor data as the human subject engages in a physical activity session. Each sensor node includes at least one inertial measurement sensor, at least one processor, and at least one memory. The operations include processing, at each of the sensor nodes, the inertial sensor data according to a first machine-learned model to generate from the inertial sensor data a set of local motion determinations for animation generation after completion of the physical activity session, receiving, at one or more computing devices from each of the plurality of sensor nodes, the set of local motion determinations identified for animation generation, processing, at the one or more computing devices, the set of local motion determinations from each of the plurality of sensor nodes according to a second machine-learned model to generate a body motion profile corresponding to the physical activity session, providing, by the one or more computing devices for display to at least one viewer, an animated display of an avatar moving according to the body motion profile, generating, by the one or more computing devices, training data based at least in part on input received from at least one viewer in response to viewing the animated display, and modifying at least one of the first machine-learned model or the second machine-learned model based at least in part on the training data.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for implementing and utilizing wearable devices and machine-learning systems for rendering animations of human motion during physical activity sessions.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
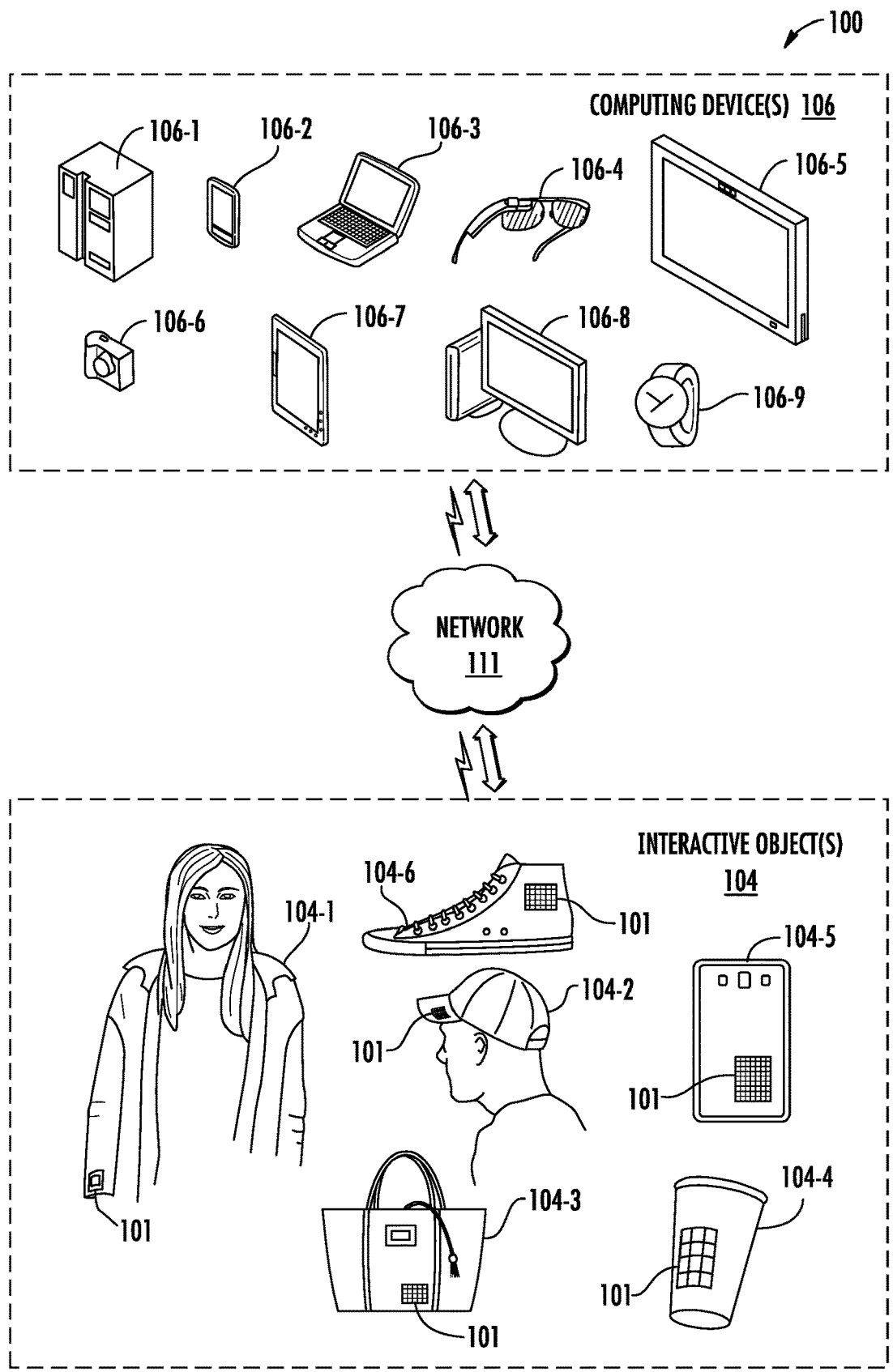
FIG. 1 depicts a block diagram of an example computing environment in which a machine-learning system in accordance with example embodiments of the present disclosure may be implemented.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to generating dynamic animation of human motion based on sensor data generated by wearable devices during physical activity sessions of human subjects. More particularly, the disclosed technology relates to a machine-learning system that is distributed across wearable devices and remote computing systems for accurate and efficient motion tracking and automatic animation rendering based on direct mappings of sensor data to motion renderings. In this manner, the machine-learning system can accurately track human motion using wearable devices with limited resources such as power and processing bandwidth. Moreover, the machine-learning system can be personalized based on training data generated in response to viewer input received in response to the animation rendering. The system can generate training data based on viewer input that indicates whether a rendered animation was exciting, interesting, or otherwise suitable for the animated rendering.

For example, a human subject may position sensors at different locations of the subject by wearing one or more wearable devices that each include one or more sensor nodes. One or more local machine-learned models at each sensor node may identify subsets of the sensor data generated by a sensor and flag these subsets for animation at the completion of a physical activity session. The sensor nodes can transmit the subsets of sensor data to one or more remote computing devices for further processing.

The remote computing device can include a portion of the machine-learning system that is configured to directly map the subset(s) of raw sensor data to motion render mappings without having to explicitly estimate exact human motion trajectories. One or more remote machine-learned models at the remote computing device, for example, may map sensor data to a body motion profile using variable interpretation and interpolation. In this manner, the system can automatically generate an animated display of an avatar for selected portions of the physical activity session corresponding to interesting movements identified by the machine-learning system. In some examples, the remote machine-learned model(s) can be configured to recognize particular patterns in sensor data and identify those patterns for motion renderings in an animated display of the physical activity session, such as in "highlight" video or other display of a selection of renderings determined to be of higher interest. The remote machine-learned models(s) at the remote computing device, for example, can generate an animated display of the physical activity session using the body motion profile.

In accordance with example aspects of the disclosed technology, a dynamic animation system may include a plurality of sensor nodes that are coupled to respective portions of a human subject. For example, the sensor nodes may be included in one or more wearable devices that are worn by the human subject while engaged in a physical activity session. Each sensor node can include at least one inertial measurement sensor, at least one processor, and at least one memory. Other sensors such as capacitive touch sensors may be used in addition to or in place of the inertial measurement sensors. Each sensor node can include a local machine-learned motion determination model that is configured to identify a subset of the inertial sensor data for animation generation after completion of the physical activity. In some examples, the local motion determination model can process the inertial sensor data and generate a set of local motion determinations. The set of local motion determinations may include the subset of raw inertial sensor data and/or one or more inferences such as user movements identified by the local motion determination model.

The dynamic animation system may also include one or more computing devices remote from the plurality of sensor nodes. The one or more remote computing devices may include a removable electronics module coupled to the wearable device(s) but remote from the sensor node(s) and/or a computing device such as a smartphone remote from the wearable device(s). The computing device can receive the subset of the inertial sensor data identified for animation generation by each of the sensor nodes. The computing device can include a remote machine-learned animation model that is configured to generate a body motion profile corresponding to the physical activity session. In some examples, the remote animation model can process the subset of the inertial sensor data from each of the sensor nodes to generate the body motion profile. The computing device can further generate an animated display of an avatar moving according to the body motion profile which is presented to at least one viewer. The computing device can generate training data based on input received from the viewer in response to viewing the at least animated display. In this manner, the computing system can modify the first machine-learned model and/or the second machine-learned model based on the training data.

To further illustrate the disclosed technology, a specific example is described with respect to animation of a human subject that engages in a snow skiing physical activity session. The human subject (or user) may create a default virtual character or avatar that can be animated in response to the subject's motions. By way of example, a virtual character can be created by selecting from a list of pre-defined characters (e.g., skiers of different body types, with various ski-wear, goggles, hats, equipment, etc.). In another example, a user may take a picture of themselves and the dynamic animation system can create a digital representation of the user that can later be animated.

The user can wear or otherwise interface with a plurality of wearable sensor nodes. Each sensor node can include at least one sensor such as an inertial measurement sensor or unit (IMU), capacitive touch sensor, or other sensor capable of measuring movement of an object. The number and location of the sensors can vary based on a particular activity and desired precision in motion modeling. By way of example, a skier engaged in a snow skiing activity session may place a sensor node in each ski-boot and in each glove. The combined data from the four sensor nodes can be used to provide a detailed representation of the user's motions. In example embodiments, the sensor nodes may simply snap into predefined locations in the boots and/or gloves and automatically connect and synchronize with the other sensors. In this manner, a seamless user experience for setup and use of the wearable sensor nodes can be provided.

In accordance with example embodiments of the disclosed technology, a user may immediately engage in a physical activity session without explicitly indicating that the session or individual motions and/or tricks are to be captured. The dynamic animation system includes one or more machine-learned models at each sensor node configured to automatically detect and record sensor data in order to select a subset of interesting motions from the sensor data generated during the physical activity session. The local machine-learned model(s) can include neural networks, non-linear models, linear models, and/or any other machine-learned model capable of identifying subsets of sensor data corresponding to interesting, exciting, or otherwise desirable movements or motions for animated rendering. The local machine-learned model(s) can be trained (or "learned") using one or more machine-learning techniques (e.g., back-propagation, supervised learning techniques, unsupervised learning techniques, etc.) to identify subsets of sensor data that will be rendered in an animated display.

The local machine-learned models may be trained to identify interesting motions based on training data indicating a user's prior motions and selected physical activities. By way of example, the machine-learned model may be trained to recognize sensor data indicative of a user standing still, riding a ski-lift, or other motion that is not considered interesting enough for rendering an animation. The machine-learned model can discard or otherwise ignore this sensor data. For example, the sensor node may discard the sensor data without transmitting it to a remote computing device for further processing. The machine-learned model may also be trained to recognize sensor data indicative of a user performing potentially interesting motions such as twists, turns, avoiding obstacles, performing jumps, etc. The model can detect these motions and record and/or flag the data for animation generation when the user completes the activity. The machine-learned models can generate a set of local motion determinations that include the subset of sensor data identified for animation generation. In some examples, the machine-learned model at a sensor node can generate inferences based on the sensor data. The local inferences (e.g., classification of the sensor data as a particular motion) can be included in the set of local motion determinations in addition to or in place of the subset of sensor data identified by the machine-learned model.

The sensor nodes can transmit the set of local determinations to one or more remote computing devices during or at the completion of a physical activity session. For example, the sensor nodes can identify the sensor data or inferences flagged for potential animation generation. The sensor nodes can transmit the identified sensor data and/or inferences as a set of local determinations for further processing by one or more portions of the machine-learning system at the remote computing device(s).

The remote computing device(s) can include one or more second machine-learned models configured to create an animated rendering of the user's motion during the physical activity session. The second machine-learned models may be referred to as remote animation model(s). The remote machine-learned animation model(s) can include neural networks, non-linear models, linear models, and/or any other machine-learned model capable of recognizing patterns in sensor data and predicting movements for rendering an animated display. The remote machine-learned model(s) can be trained (or "learned") using one or more machine-learning techniques (e.g., backpropagation, supervised learning techniques, unsupervised learning techniques, etc.) to recognize patterns in the sensor data and generate motion renderings from the patterns. The remote computing device can input the set of local determinations to the one or more second machine-learned models. The one or more second machine-learned models can generate a body motion profile based on the sensor data indicative of user movements during the physical activity session. The body motion profile can be used to generate the animated rendering of the user's motion.

In accordance with example aspects of the present disclosure, the second machine-learned model can be configured to recognize particular patterns in the sensor data that correspond to a subset of motions that will be rendered in a final animated display. For instance, the second machine-learned model can be trained to recognize patterns that viewers find exciting or otherwise more interesting to view than other patterns. By way of example, the second machine-learned model may be trained to recognize certain patterns of interest for snow skiing. The second machine-learned model may be trained to recognize patterns of quick vertical changes (e.g., corresponding to a jump), repeated and rapid directional changes (e.g., turning or slaloming through moguls), high twisting activity followed by a stop (e.g., the skier crashed). The recognized patterns of interest can be rendered by the machine-learning system for the animated display of the physical activity. Importantly, these recognized patterns of interest may be rendered in the animated display while other patterns may be omitted from the display. Such a technique not only increases the viewer's interest in the rendered display, but can also reduce computing resources by reducing the amount of sensor data that is rendered in the animation.

According to some example aspects, the machine-learned model(s) at the remote computing device may be configured to directly map raw sensor data from the local motion determinations to a motion render mapping without explicitly estimating the exact human motion trajectory of the human subject that resulted in the raw sensor data. Instead, the machine-learned model can leverage a confidence associated with its predictions of user motion when mapping the user motion to a motion rendering. In this manner, the machine-learned model can add additional details to the motion rendering when the model is very confident of the predicted user motion. When the model is less confident in a predicted user motion, the model can add more creative interpretation and interpolation of the mapping. From a user's perspective, these changes in model confidence may appear as style transitions in the motion rendering while providing the user with a rewarding visual experience of the motion or trick.

In accordance with example embodiments of the disclosed technology, the machine-learning system can be trained based on knowledge of a user's prior motions, chosen activity, and/or inputs regarding a desirability of particularly rendered animations. The first machine-learned model(s) at the sensor nodes can be trained to recognize interesting motions in order to flag and transmit the set of local determinations. The set of local determinations may include a subset of all of the sensor data corresponding to a physical activity session. The first machine-learned models can be trained to recognize portions of the sensor data as corresponding to more interesting or dynamic motions. The second machine-learned model(s) of the machine-learning system can be trained to recognize patterns in the set of local determinations that a viewer is more likely to find exciting or otherwise enjoyable to view. The second machine-learned model can be trained to generate animations of predicted human motion using the recognized patterns from the set of local determinations.

In accordance with example aspects, training data for training the machine-learning system can be generated in response to user input received from a user viewing an animated display of the sensor data. A viewer of the animated display may provide a positive response to a rendered movement, such as an input indicating that a particularly rendered movement is exciting. Additionally or alternatively, a viewer of the animated display may provide a negative response to the rendered movement, such as an input indicating that the particular movement is not exciting or was not desirable for view in the animated rendering. The sensor data corresponding to the rendered movement can be annotated with one or more labels indicating the sensor data as positive or negative training data.

The training data can be used to train the machine-learned model(s) at the sensor nodes and/or the machine-learned models at the remote computing device. For instance, a first machine-learned model for a sensor node can be trained to identify particular motions as interesting based on the positive and/or negative training data. The sensor data can be input to the first machine-learned model and the resulting model predictions can be compared to the annotations to detect errors in the sensor data that is flagged for animation rendering. The first machine-learned model can be modified based on the training data. For example, one or more error functions can be backpropagated to the model based on detected errors during training. A second machine-learned model for a remote computing device can be trained to recognize particular patterns of sensor data for rendering in an animated display. The sensor data can be input to the second machine-learned model and the selected animations can be compared to detect errors in the sensor data that was rendered in the animated display (e.g., as part of a highlight reel). The second machine-learned model can be modified based on the detected errors in determining which patterns of sensor data to animate.

Systems and methods in accordance with the disclosed technology provide a number of technical effects and benefits, particularly in the areas of computing technology and distributed machine-learned processing of sensor data for wearable devices. As one example, the systems and methods described herein can enable a wearable device with limited compute capacity and/or power capacity to efficiently manage the use of sensor data. For example, the machine-learned system may include one or more local determination models at each sensor data in order to identify subsets of sensor data that should be transmitted to a remote computing device for further processing. In this manner, the system can efficiently leverage the limited compute and power capacity of the wearable device by selectively storing and transmitting sensor data based on a local determination of its suitability for animation generation.

Additionally, the machine-learned system can enable a remote computing device to generate motion renderings based on a limited subset of sensor data received from the sensor nodes. One or more machine-learned models can be configured to identify from the subsets of sensor data patterns of sensor data associated with motions that are more desirable or otherwise more interesting for inclusion in an animated rendering of human motion. The machine-learned model can generate animated renderings of these particular patterns of sensor data in order to efficiently render the sensor data. By not generating an animated rendering of less interesting sensor data, the remote computing device can further avoid computing inefficiencies.

Embodiments of the present disclosure further enable a machine-learned system to directly map sensor data to a motion render mapping without explicitly estimating exact human trajectories. The machine-learned system can determine a confidence associated with its predicted human motions and leverage the determined confidence for motion rendering. More details can be used for higher confidence predictions and more interpretation and/or interpolation can be used for lower confidence predictions. In this manner, the machine-learned system can use less sensor data to generate high-quality motions renderings for a rewarding visual experience. The use of such techniques can be contrasted with traditional techniques that require expensive and heavy/large wearable technology to precisely track human motions. These systems require larger hardware investments. Moreover, they typically generate an entire stream of replicated motions that must be hand-edited to provide a useful animation. By contrast, the machine-learned system as described enables the generation of highlight animations of select human movements using the limited sensing and compute capacity of simple and inexpensive sensor systems.

In some implementations, in order to obtain the benefits of the techniques described herein, the user may be required to allow the collection and analysis of sensor data associated with the user or their device. For example, in some implementations, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed. As an example, a computing system can obtain sensor data which can indicate a movement, without identifying any particular user(s) or particular user computing device(s).

With reference now to the figures, example aspects of the present disclosure will be discussed in greater detail.

FIG. 1 is an illustration of an example environment 100 including an interactive object associated with a machine-learned model in accordance with example embodiments of the present disclosure. Environment 100 includes various interactive objects 104 which can include a sensor node 101. The sensor node 101 at each interactive object can include an inertial measurement sensor, a processor, and a memory in example embodiments. The sensor nodes may include a local power supply or may be powered by another device such as a removable electronics module coupled to the interactive object. Although a single sensor node is shown for each interactive object, an interactive object may include more than one sensor node.

In environment 100, interactive objects 104 include "flexible" objects, such as a shirt 104-1, a hat 104-2, a handbag 104-3 and a shoe 104-6. It is to be noted, however, that sensor node may be integrated within any type of flexible object made from fabric or a similar flexible material, such as garments or articles of clothing, garment accessories, garment containers, blankets, shower curtains, towels, sheets, bed spreads, or fabric casings of furniture, to name just a few. Examples of garment accessories may include sweat-wicking elastic bands to be worn around the head, wrist, or bicep. Other examples of garment accessories may be found in various wrist, arm, shoulder, knee, leg, and hip braces or compression sleeves. Headwear is another example of a garment accessory, e.g. sun visors, caps, and thermal balaclavas. Examples of garment containers may include waist or hip pouches, backpacks, handbags, satchels, hanging garment bags, and totes. Garment containers may be worn or carried by a user, as in the case of a backpack, or may hold their own weight, as in rolling luggage. Sensor node 101 may be integrated within flexible objects 104 in a variety of different ways, including weaving, sewing, gluing, and so forth.

In this example, objects 104 further include "hard" objects, such as a plastic cup 104-4 and a hard smart phone casing 104-5. It is to be noted, however, that hard objects 104 may include any type of "hard" or "rigid" object made from non-flexible or semi-flexible materials, such as plastic, metal, aluminum, and so on. For example, hard objects 104 may also include plastic chairs, water bottles, plastic balls, or car parts, to name just a few. In another example, hard objects 104 may also include garment accessories such as chest plates, helmets, goggles, shin guards, and elbow guards. Alternatively, the hard or semi-flexible garment accessory may be embodied by a shoe, cleat, boot, or sandal. Sensor node 101 may be integrated within hard objects 104 using a variety of different manufacturing processes.

Sensor node 101 may communicate with a variety of other computing devices 106 via a network 111, such as to transmit sensor data or other information and/or commands to the object 104. Computing devices 106 are illustrated with various non-limiting example devices: server 106-1, smart phone 106-2, laptop 106-3, computing spectacles 106-4, television 106-5, camera 106-6, tablet 106-7, desktop 106-8, and smart watch 106-9, though other devices may also be used, such as home automation and control systems, sound or entertainment systems, home appliances, security systems, netbooks, and e-readers. Note that computing device 106 can be wearable (e.g., computing spectacles and smart watches), non-wearable but mobile (e.g., laptops and tablets), or relatively immobile (e.g., desktops and servers). Computing device 106 is remote from the sensor node and may be accessed over a bluetooth connection, near-field communication connection, or other local-network connection.

Network 111 includes one or more of many types of wireless or partly wireless communication networks, such as a local-area-network (LAN), a wireless local-area-network (WLAN), a personal-area-network (PAN), a wide-area-network (WAN), an intranet, the Internet, a peer-to-peer network, point-to-point network, a mesh network, and so forth.

Figure 2:
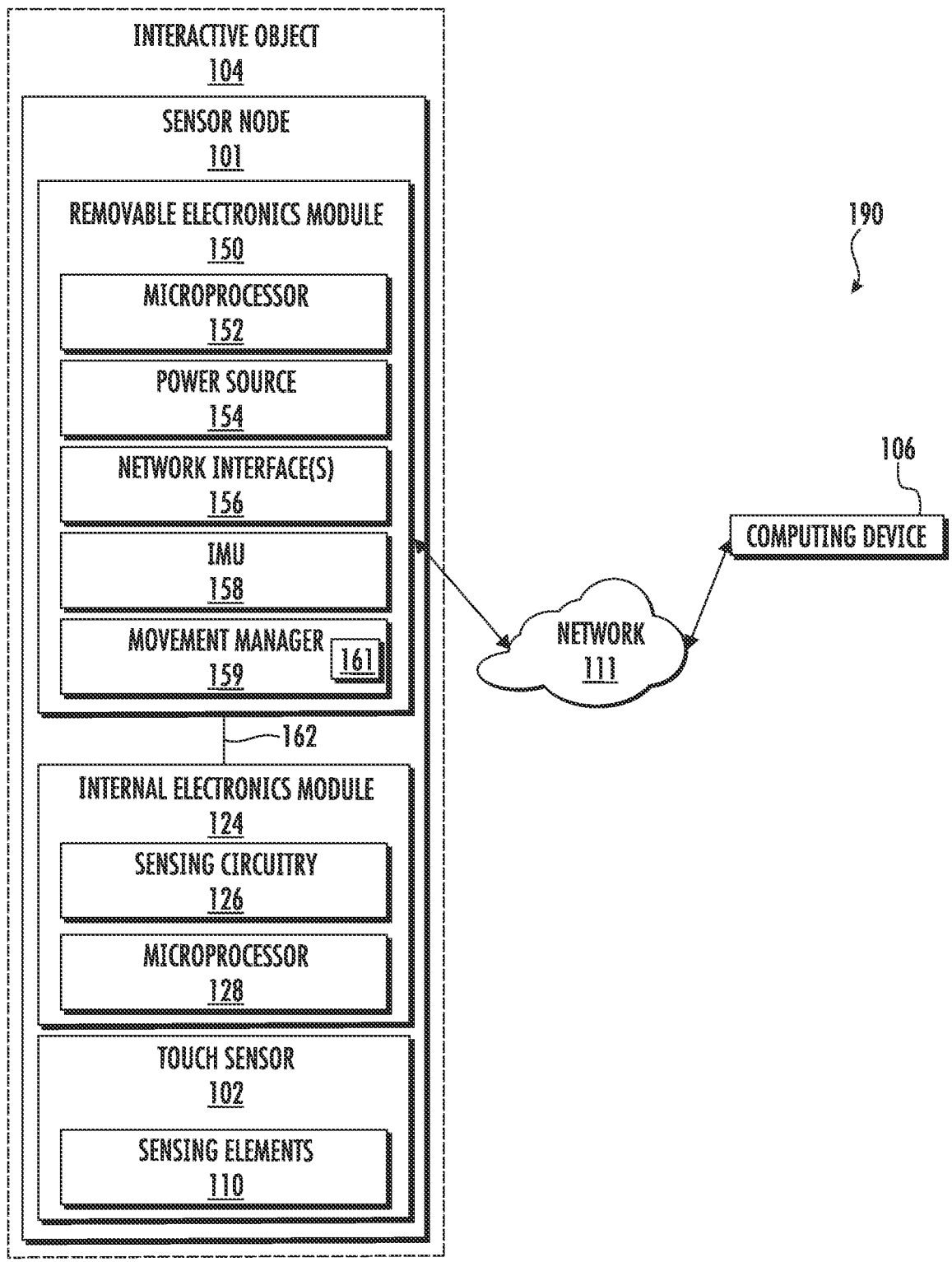
FIG. 2 depicts a block diagram of an example computing environment that includes a sensor node for a wearable device in accordance with example embodiments of the present disclosure.

In more detail, consider FIG. 2 which illustrates an example computing environment 190 that includes an interactive object 104 (e.g., wearable device) and a remote computing device 106. In environment 190, interactive object 104 includes at least one sensor node 101. Sensor node 101 includes a removable electronics module 150 and an internal electronics module 124. Internal electronics module 124 can be communicatively coupled to a removable electronics module 150 via a communication interface 162.

Internal electronics module 124 contains a first subset of electronic circuits or components for the interactive object 104, and removable electronics module 150 contains a second, different, subset of electronic circuits or components for the interactive object 104. As described herein, the internal electronics module 124 may be physically and permanently embedded within interactive object 104, whereas the removable electronics module 150 may be removably coupled to interactive object 104. It is noted however, that a sensor node can include a single electronics module including a sensor in example embodiments. For example, a sensor node 101 may include a removable electronics module 150 and not include an internal electronics module 124.

In environment 190, the removable electronics module 150 includes a microprocessor 152, power source 154, network interface(s) 156, and inertial measurement unit 158. An inertial measurement unit 158 is an example of an inertial measurement sensor.

The inertial measurement unit(s) (IMU(s)) 158 can generate sensor data indicative of a position, velocity, and/or an acceleration of the interactive object. The IMU(s) 158 may generate one or more outputs describing one or more three-dimensional motions of the interactive object 104. The IMU(s) may be secured to the internal electronics module 124, for example, with zero degrees of freedom, either removably or irremovably, such that the inertial measurement unit translates and is reoriented as the interactive object 104 is translated and are reoriented. In some embodiments, the inertial measurement unit(s) 158 may include a gyroscope or an accelerometer (e.g., a combination of a gyroscope and an accelerometer), such as a three axis gyroscope or accelerometer configured to sense rotation and acceleration along and about three, generally orthogonal axes. In some embodiments, the inertial measurement unit(s) may include a sensor configured to detect changes in velocity or changes in rotational velocity of the interactive object and an integrator configured to integrate signals from the sensor such that a net movement may be calculated, for instance by a processor of the inertial measurement unit, based on an integrated movement about or along each of a plurality of axes.

A movement manager 159 can be implemented by one or more computing devices in computing environment 190. In the example of FIG. 2, movement manager 159 is implemented at removable electronics module 150. It will be appreciated, however, that movement manager 159 may be implemented additionally or alternatively at interactive object 104 and/or a computing device 106. The movement manager can be capable of interacting with applications at computing devices 106, touch sensor 102, and/or IMU(s) 158. The movement manager is effective to activate various functionalities associated with computing devices (e.g., computing devices 106) and/or applications through touch-input (e.g., gestures) received by a capacitive touch sensor 102 and/or motion detected by IMU(s) 158. The movement manager may be implemented at a computing device that is local to object 104 and/or remote from object 104. The movement manager can be capable of interacting with applications at computing devices and inertial measurement unit 158 effective to activate various functionalities associated with computing devices and/or applications through movement detected by inertial measurement unit 158.

The movement manager can utilize one or more local machine-learned motion determination models 161 for generating local motion determinations that are to be transmitted to a remote computing device 106 for further processing.

The local machine-learned motion determination model(s) 161 can form a part of a dynamic animation machine-learning system in accordance with example embodiments of the present disclosure. The local machine-learned motion determination models 161 may be trained to identify interesting motions based on training data indicating a user's prior motions and selected physical activities. The machine-learned model can discard or otherwise ignore sensor data that is not associated with an interesting motion. For example, the sensor node may discard the sensor data without transmitting it to a remote computing device for further processing. The model can detect interesting motions and record and/or flag the data for animation generation when the user completes the activity. The machine-learned model can generate a set of local motion determinations that include the subset of sensor data identified for animation generation. In some examples, the machine-learned model at a sensor node can generate inferences based on the sensor data. The inferences (e.g., classification of the sensor data as a particular motion) can be included in the set of local motion determinations in addition to or in place of the subset of sensor data identified by the machine-learned model.

Removable electronics module 150 can include a power source 154 that may be coupled, via communication interface 162, to sensing circuitry 126 to provide power to sensing circuitry 126 to enable the detection of touch-input, and may be implemented as a small battery. In one or more implementations, communication interface 162 is implemented as a connector that is configured to connect removable electronics module 150 to internal electronics module 124 of interactive object 104.

Communication interface 162 enables the transfer of power and data (e.g., the touch-input detected by sensing circuitry 126) between the internal electronics module 124 and the removable electronics module 150. In some implementations, communication interface 162 may be implemented as a connector that includes a connector plug and a connector receptacle. The connector plug may be implemented at the removable electronics module 150 and configured to connect to the connector receptacle, which may be implemented at the interactive object 104.

Internal electronics module 124 can include a capacitive touch sensor 102 and/or other touch sensors (e.g., resistive). Touch sensor 102 can be integrated as an interactive textile or other flexible interactive material that is configured to sense touch-input (e.g., multi-touch input). As described herein, a textile may include any type of flexible woven material consisting of a network of natural or artificial fibers, often referred to as thread or yarn. Textiles may be formed by weaving, knitting, crocheting, knotting, pressing threads together or consolidating fibers or filaments together in a nonwoven manner.

Touch sensor 102 can interact with computing devices 106 by transmitting touch data or other sensor data through network 111. Additionally or alternatively, touch sensor 102 may transmit gesture data, movement data, or other data derived from sensor data generated by the capacitive touch sensor 102. Computing device 106 can use the touch data to control computing device 106 or applications at computing device 106. As an example, consider that capacitive touch sensor 102 integrated at shirt 104-1 may be configured to control the user's smart phone 106-2 in the user's pocket, television 106-5 in the user's home, smart watch 106-9 on the user's wrist, or various other appliances in the user's house, such as thermostats, lights, music, and so forth. For example, the user may be able to swipe up or down on capacitive touch sensor 102 integrated within the user's shirt 104-1 to cause the volume on television 106-5 to go up or down, to cause the temperature controlled by a thermostat in the user's house to increase or decrease, or to turn on and off lights in the user's house. Note that any type of touch, tap, swipe, hold, or stroke gesture may be recognized by capacitive touch sensor 102.

When touch-input is detected by sensing circuitry 126 of the internal electronics module 124, data representative of the touch-input may be communicated, via communication interface 162, to microprocessor 152 of the removable electronics module 150. Microprocessor 152 may then transmit the touch-input data and/or analyze the touch-input data to generate one or more control signals, which may then be communicated to computing device 106 (e.g., a smart phone) via the network interface 156 to cause the computing device 106 to initiate a particular functionality. Generally, network interfaces 156 are configured to communicate data, such as touch data, over wired, wireless, or optical networks to computing devices 106. By way of example and not limitation, network interfaces 156 may communicate data over a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like (e.g., through network 111).

Touch sensor 102 is configured to sense touch-input from a user when one or more fingers of the user's hand touch sensor 102. Touch sensor 102 may be configured to sense single-touch, multi-touch, and/or full-hand touch-input from a user. To enable the detection of touch-input, touch sensor 102 includes sensing elements, which can be formed as a grid, array, or parallel pattern so as to detect touch input. In some implementations, the sensing elements 110 do not alter the flexibility of touch sensor 102, which enables touch sensor 102 to be easily integrated within interactive objects 104.

In environment 190, the electronic components contained within the internal electronics module 124 includes sensing circuitry 126 that is coupled to sensing elements 110 that form the capacitive touch sensor 102. In some examples, the internal electronics module comprises a flexible printed circuit board (PCB). The printed circuit board can include a set of contact pads for attaching to the conductive lines. In some examples, the printed circuit board includes a microprocessor. For example, wires from conductive threads may be connected to sensing circuitry 126 using flexible PCB, creping, gluing with conductive glue, soldering, and so forth. In one embodiment, the sensing circuitry 126 can be configured to detect a user-inputted touch-input on the conductive threads that is pre-programmed to indicate a certain request. In one embodiment, when sensing elements such as conductive threads form a grid or other pattern, sensing circuitry 126 can be configured to also detect the location of the touch-input on sensing element 110, as well as motion of the touch-input. For example, when an object, such as a user's finger, touches sensing element 110, the position of the touch can be determined by sensing circuitry 126 by detecting a change in capacitance on the grid or array of sensing element 110. The touch-input may then be used to generate touch data usable to control a computing device 106. For example, the touch-input can be used to determine various gestures, such as single-finger touches (e.g., touches, taps, and holds), multi-finger touches (e.g., two-finger touches, two-finger taps, two-finger holds, and pinches), single-finger and multi-finger swipes (e.g., swipe up, swipe down, swipe left, swipe right), and full-hand interactions (e.g., touching the textile with a user's entire hand, covering textile with the user's entire hand, pressing the textile with the user's entire hand, palm touches, and rolling, twisting, or rotating the user's hand while touching the textile).

While internal electronics module 124 and removable electronics module 150 are illustrated and described as including specific electronic components, it is to be appreciated that these modules may be configured in a variety of different ways. For example, in some cases, electronic components described as being contained within internal electronics module 124 may be at least partially implemented at the removable electronics module 150, and vice versa. Furthermore, internal electronics module 124 and removable electronics module 150 may include electronic components other that those illustrated in FIG. 2, such as sensors, light sources (e.g., LED's), displays, speakers, and so forth.

Figure 3:
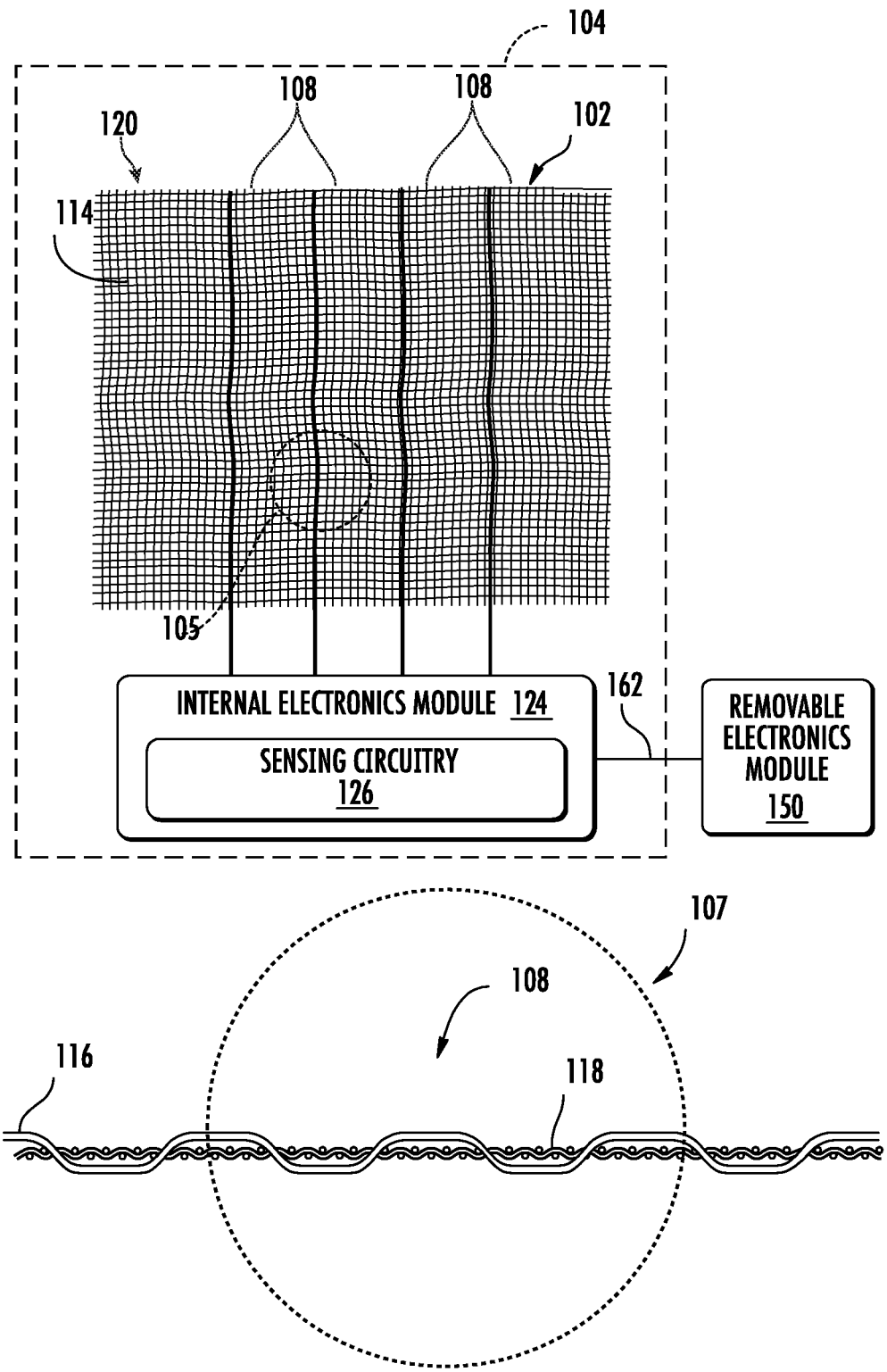
FIG. 3 depicts an example of a touch sensor in accordance with example embodiments of the present disclosure.

FIG. 3 illustrates an example 300 of an interactive object 104 with multiple electronics modules in accordance with example embodiments of the present disclosure. In this example, a capacitive touch sensor 102 of the interactive object 104 includes non-conductive threads 114 woven with conductive threads 108 to form touch sensor 102 (e.g., interactive textile). Conductive threads 108 are one example of sensing elements 110. It will be appreciated that additional types of sensing elements 110 may be used. Non-conductive threads may correspond to any type of non-conductive thread, fiber, or fabric, such as cotton, wool, silk, nylon, polyester, and so forth. Touch sensor 102 can be configured as a capacitive touch sensor or resistive touch sensor in example embodiments. Together, non-conductive threads 114 and conductive threads 108 form a textile or textile-based substrate 120.

At 107, a zoomed-in view of conductive thread 308 is illustrated. Conductive thread 108 includes a conductive wire 116 or a plurality of conductive filaments that are twisted, braided, or wrapped with a flexible thread 118. As shown, the conductive thread 108 can be woven or otherwise integrated with the non-conductive threads to form a fabric or a textile-based substrate 120. Although a conductive thread and textile is illustrated, it will be appreciated that other sensing elements and substrates may be used, such as flexible metal lines formed on a plastic substrate.

In one or more implementations, conductive thread 108 includes a thin copper wire. It is to be noted, however, that the conductive thread 108 may also be implemented using other materials, such as silver, gold, or other materials coated with a conductive material. The conductive thread 108 may include an outer cover layer formed by braiding together non-conductive threads. The non-conductive threads may be implemented as any type of flexible thread or fiber, such as cotton, wool, silk, nylon, polyester, and so forth.

Conductive wire 116 may be combined with flexible threads 118 in a variety of different ways, such as by twisting flexible threads 118 with conductive wire 116, wrapping flexible threads 118 with conductive wire 116, braiding or weaving flexible threads 118 to form a cover that covers conductive wire 116, and so forth. Conductive wire 116 may be implemented using a variety of different conductive materials, such as copper, silver, gold, aluminum, or other materials coated with a conductive polymer. Flexible thread 118 may be implemented as any type of flexible thread or fiber, such as cotton, wool, silk, nylon, polyester, and so forth.

Combining conductive wire 116 with flexible thread 118 causes conductive thread 108 to be flexible and stretchy, which enables conductive thread 108 to be easily woven with one or more non-conductive threads 114 (e.g., cotton, silk, or polyester). In one or more implementations, conductive thread includes a conductive core that includes at least one conductive wire 116 (e.g., one or more copper wires) and a cover layer, configured to cover the conductive core, that is constructed from flexible threads 118 In some cases, conductive wire 116 of the conductive core is insulated. Alternately, conductive wire 116 of the conductive core is not insulated.

In one or more implementations, the conductive core may be implemented using a single, straight, conductive wire 116. Alternately, the conductive core may be implemented using a conductive wire 116 and one or more flexible threads 118. For example, the conductive core may be formed by twisting one or more flexible threads 118 (e.g., silk threads, polyester threads, or cotton threads) with conductive wire 116, or by wrapping flexible threads 118 around conductive wire 116.

Touch sensor 102 can be formed efficiently and in a low-cost manner, using any conventional weaving process (e.g., jacquard weaving or 3D-weaving), which involves interlacing a set of longer threads (called the warp) with a set of crossing threads (called the weft). Weaving may be implemented on a frame or machine known as a loom, of which there are a number of types. Thus, a loom can weave non-conductive threads 114 with conductive threads 108 to create touch sensor 102.

Figure 4:
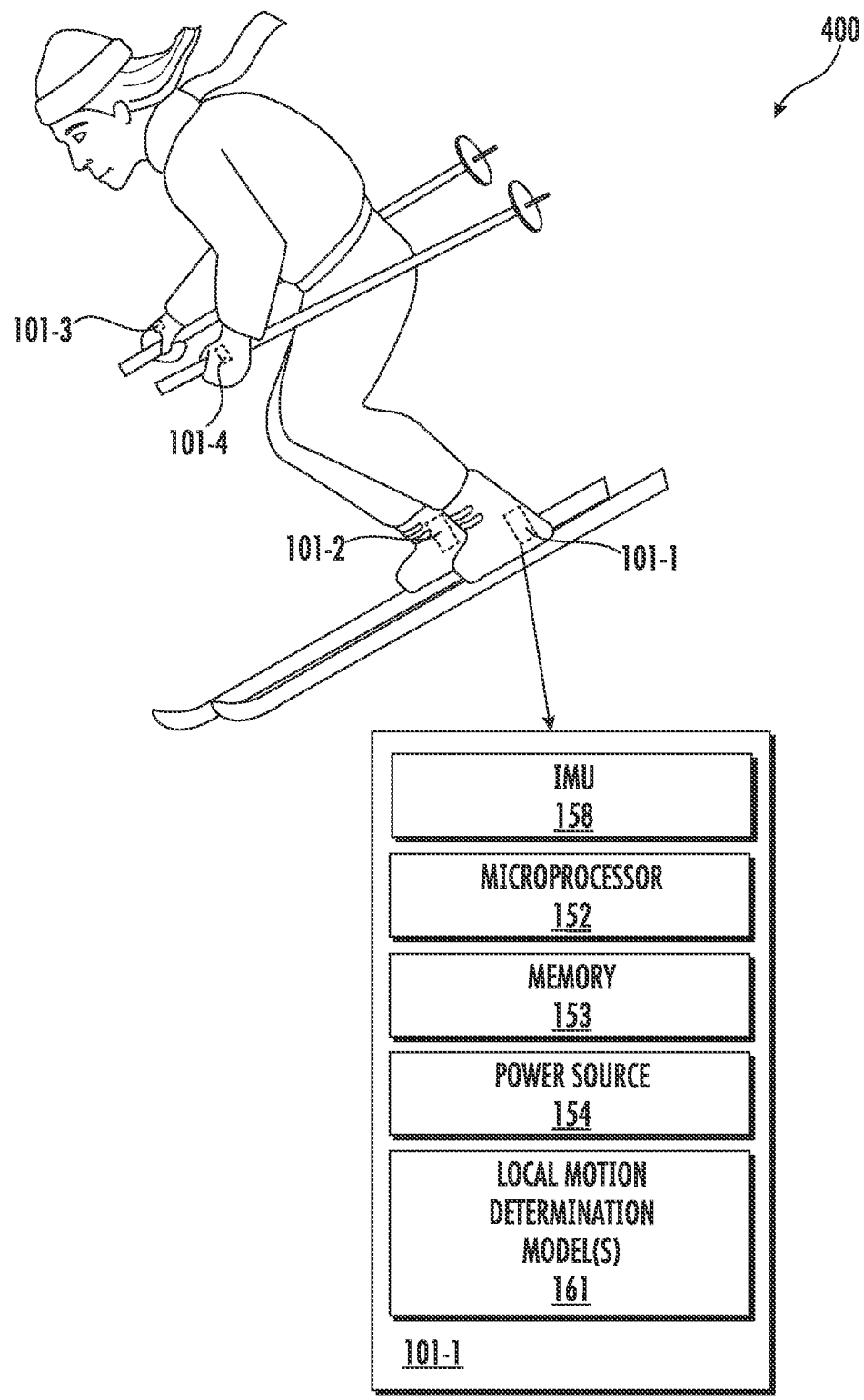
FIG. 4 depicts an example of a computing environment including multiple sensor nodes configured to detect movement of a human subject during a physical activity session in accordance with example embodiments of the present disclosure.

FIG. 4 is a block diagram depicting an example computing environment 400 in which a machine-learned system can be provisioned in accordance with an example implementation of the present disclosure. Computing environment 400 includes a plurality of sensor nodes 101-1, 101-2, 101-3, 101-4. Each sensor node can be configured as sensor node 101 illustrated in FIG. 2 in example embodiments. In FIG. 4, each sensor node can include a reduced set of components at least one sensor such as an inertial measurement unit (IMU) 158, capacitive touch sensor, or other sensor capable of measuring movement of an object, a processor such as microprocessor The number and location of the sensors can vary based on a particular activity and desired precision in motion modeling. Each sensor node can further include a microprocessor 152, memory 153, power source 154, and one or more local machine-learned motion determination model(s) 161.

Sensor nodes 101-1 and 101-2 are coupled to or otherwise integrated with the ski boots worn by user 402. Sensor nodes 101-3 and 101-4 are coupled to or otherwise integrated with the gloves worn by user 402. In example embodiments, each sensor node may be implemented as a removable electronics module 150 which can simply snap into predefined locations in the boots and/or gloves and automatically connect and synchronize with the other sensors. In this manner, a seamless user experience for setup and use of the wearable sensor nodes can be provided. It will be appreciated that four sensor nodes are depicted by way of example only, and that more or fewer sensor nodes may be included in example embodiments. The user can wear or otherwise interface with any number of wearable sensor nodes.

By way of example, user 402 may engage in a physical activity session, such as a snow skiing session. One or more sensors such as one or more inertial measurement units included within each sensor node can generate sensor data associated with the user movement and provide the sensor data to a machine-learning system including a local motion determination model at the respective sensor node. The combined data from the four sensor nodes can be used to provide a detailed representation of the user's motions.

A user may immediately engage in a physical activity session without explicitly indicating that the session or individual motions and/or tricks are to be captured. The local machine-learned motion determination model 161 at each sensor node is configured to automatically detect and record sensor data in order to select a subset of interesting motions from the sensor data generated during the physical activity session. The machine-learned model may be trained to identify interesting motions based on training data indicating a user's prior motions and selected physical activities. Subsets of the sensor data identified as interesting may be stored in memory 153 and transmitted to a remote computing device for further processing while other sensor data deemed uninteresting may be discarded or overwritten in memory 153.

Figure 5:
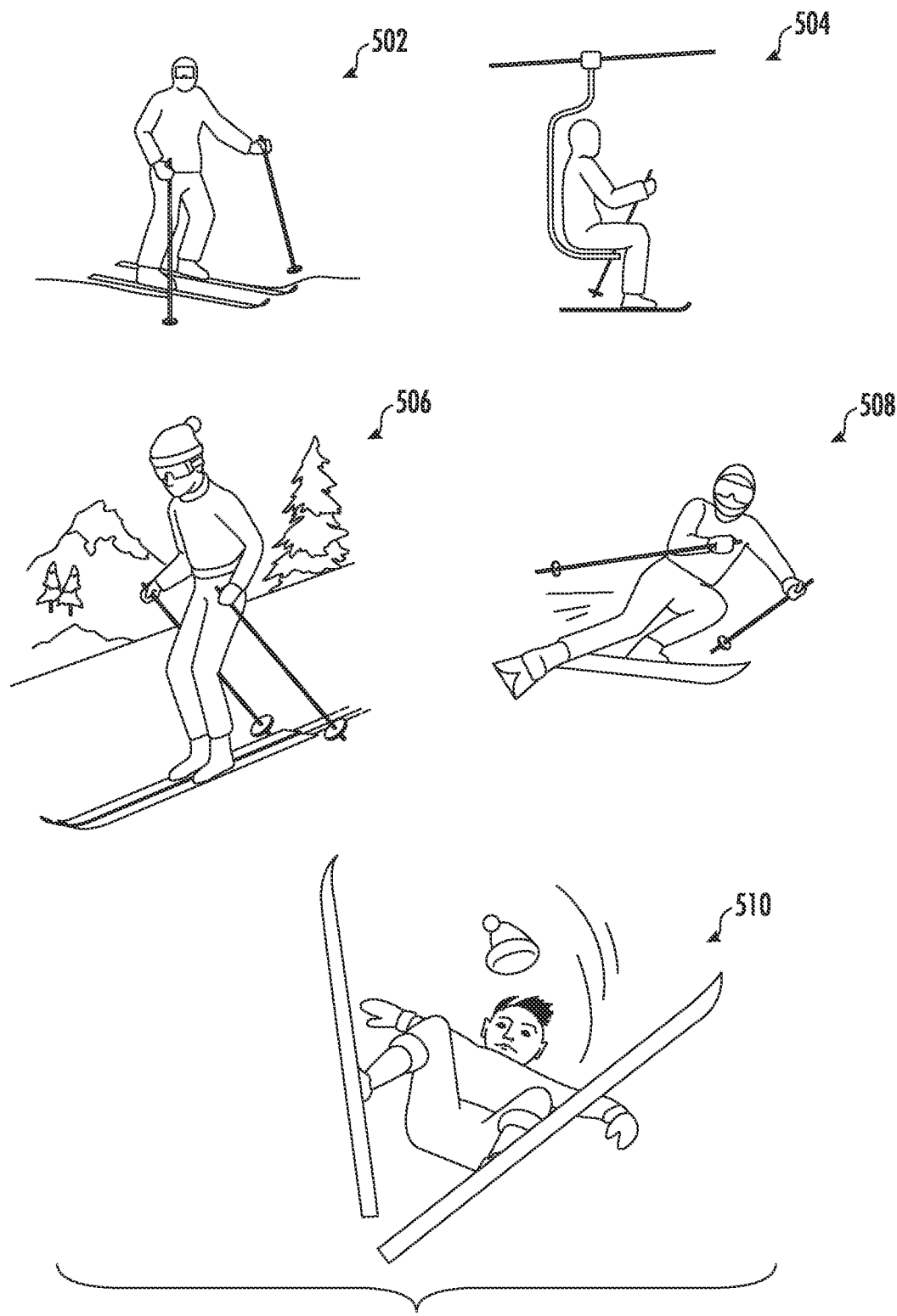
FIG. 5 depicts examples of a human movement that can be detected by one or more wearable devices including sensor nodes in accordance with example embodiments of the present disclosure.

With reference to FIG. 5 for example, the motion determination model 161 may be trained to recognize sensor data indicative of a user standing still as illustrated at 502, riding a ski-lift as illustrated at 504, or other motion that is not considered interesting enough for rendering an animation. The machine-learned model can discard or otherwise ignore this sensor data. For example, the sensor data may discard the sensor data without transmitting it to a remote computing device for further processing. The machine-learned model may also be trained to recognize sensor data indicative of a user performing potentially interesting motions such as moving fast downhill as shown at 506, twists or turns as shown at 508, performing jumps, etc. The model may further be trained to recognize movements such as sudden direction changes followed by a stop as may be indicative of a crash as shown at 510. The model can detect these motions and record the corresponding sensor data in memory 153. The sensor data can be flagged for animation generation when the user completes the activity. The machine-learned models can generate a set of local motion determinations that include the subset of sensor data identified for animation generation. In some examples, the machine-learned model at a sensor node can generate inferences based on the sensor data. The inferences (e.g., classification of the sensor data as a particular motion) can be included in the set of local motion determinations in addition to or in place of the subset of sensor data identified by the machine-learned model.

Figure 6:
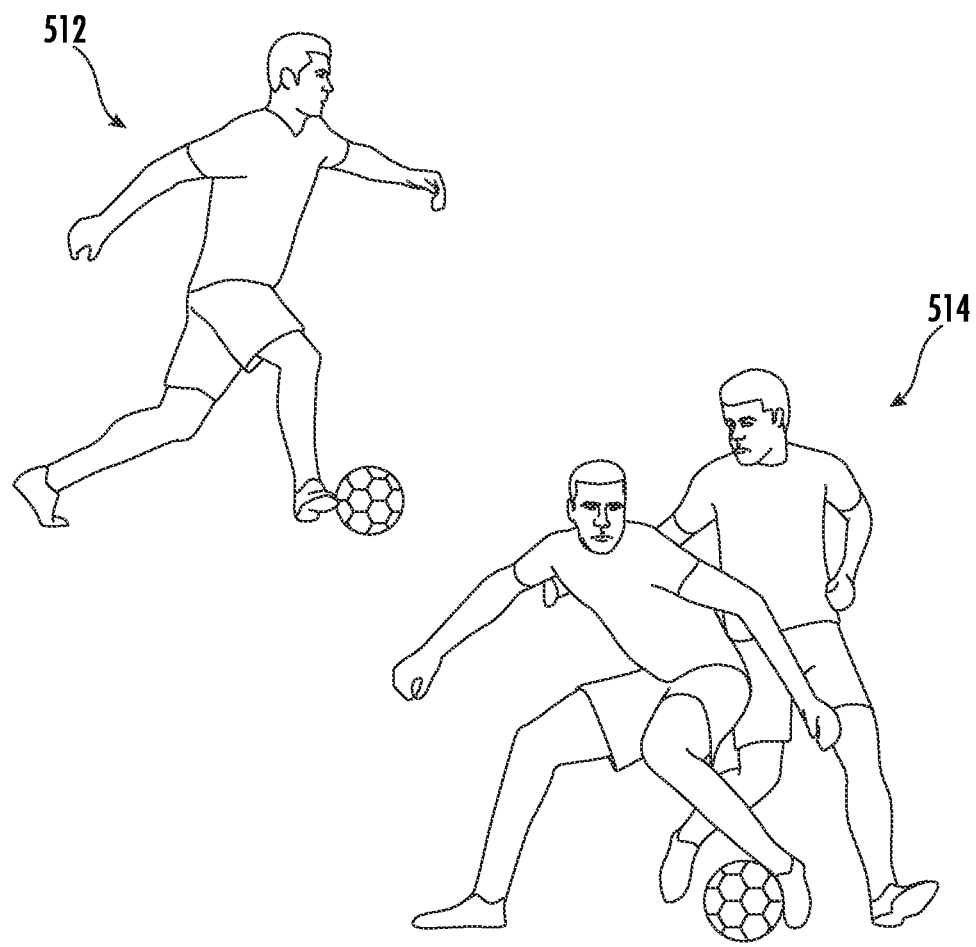
FIG. 6 depicts examples of a human movement that can be detected by one or more wearable devices including sensor nodes in accordance with example embodiments of the present disclosure.
Figure 6:
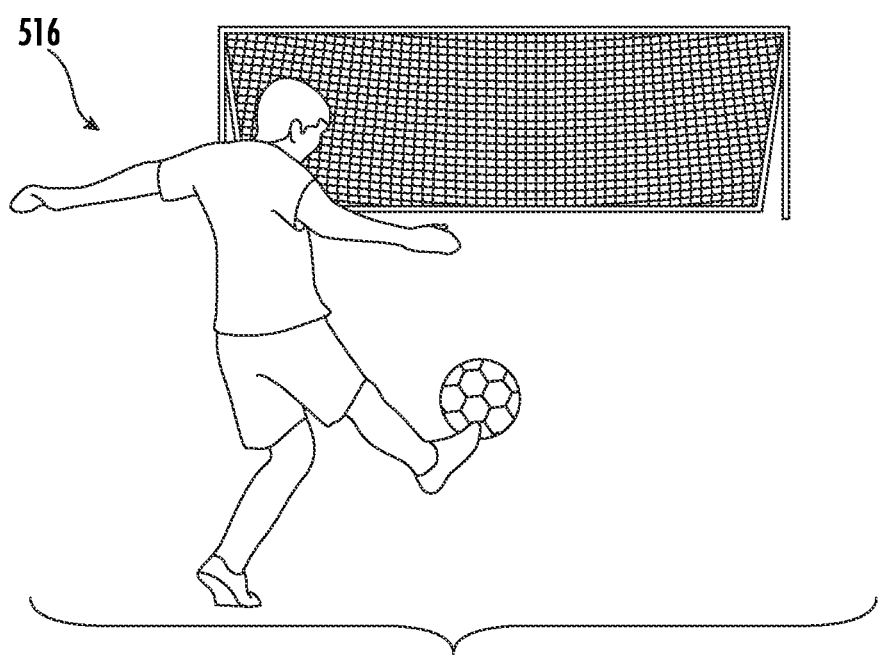

With reference to FIG. 6 for example, the motion determination model 161 may be trained to recognize sensor data indicative of a user running while kicking or dribbling a ball as illustrated at 512, spinning to get around another player at 514, and kicking the ball to score a goal (e.g., in a stylish way) at 516. The machine-learned model may be trained to recognize sensor data indicative of a user performing these potentially interesting motions. The sensor data can be flagged for animation generation when the user completes the activity. The machine-learned models can generate a set of local motion determinations that include the subset of sensor data identified for animation generation. In some examples, the machine-learned model at a sensor node can generate inferences based on the sensor data. The inferences (e.g., classification of the sensor data as a particular motion) can be included in the set of local motion determinations in addition to or in place of the subset of sensor data identified by the machine-learned model.

Sensor nodes 101 may communicate with one or more remote computing devices 106 during or at the completion of a physical activity session to transmit local motion determinations for further processing. For example, the sensor nodes can identify the sensor data or inferences flagged for potential animation generation. The sensor nodes can transmit the identified sensor data and/or inferences as a set of local determinations for further processing by one or more portions of the machine-learning system at the remote computing device(s).

Figure 7:
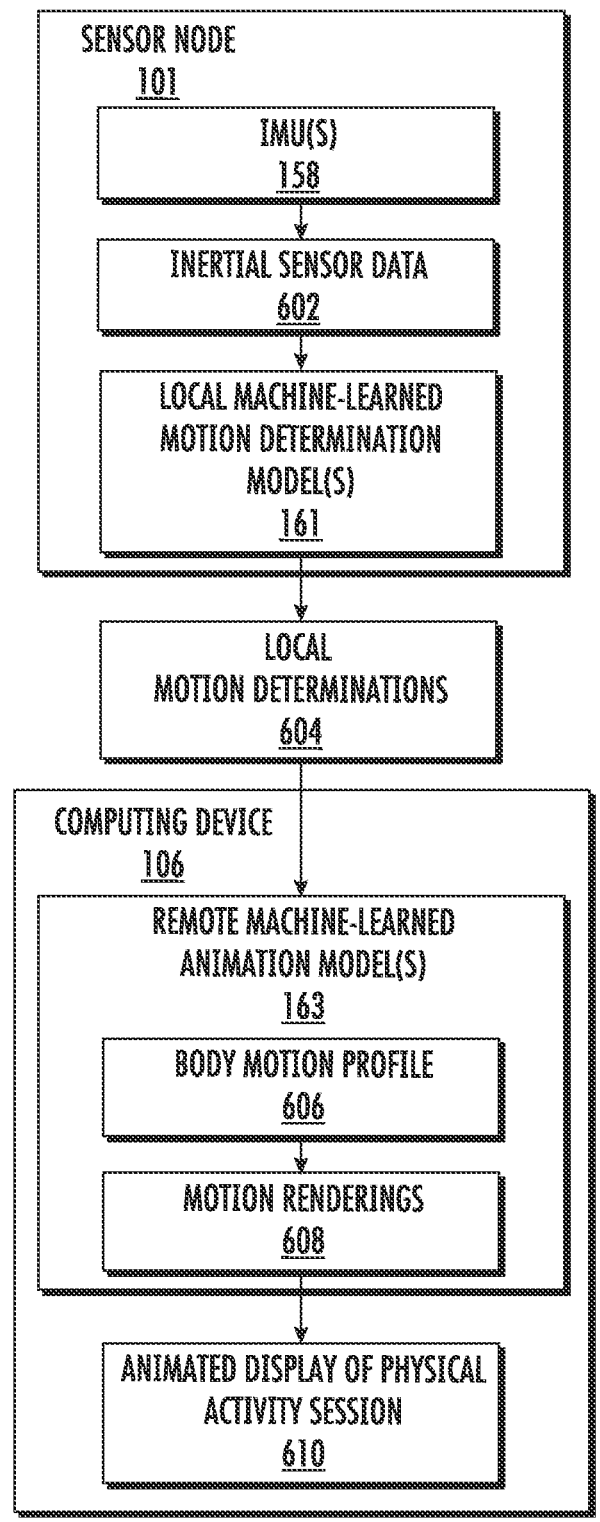
FIG. 7 depicts a block diagram of an example computing environment including a machine-learned system for local motion determinations and a machine-learned system for remote animation of human movement.

FIG. 7 is a block diagram depicting an example computing environment 600 according to example aspects of the present disclosure. FIG. 7 depicts a sensor node 101 which can be implemented as part of a wearable device or other interactive object in example embodiments. Sensor node 101 is in communication with a remote computing device 106 over one or more networks (not shown). It is noted that sensor node 101 and remote computing device 106 may not be in constant or consistent communication with each other. For instance, sensor node 101 may be disconnected from remote computing device 106 during a physical activity session. At the completion of the physical activity session, the sensor node 101 may establish a network connection with the remote computing device 106 over a network. In other examples, sensor node 101 may be in communication with the remote computing device 106 during all or a portion of the physical activity session. In any case, sensor node 101 transmits data including local motion determinations to remote computing device 106.

Sensor node 101 includes one or more IMU's 158 and/or other sensor configured to generate sensor data descriptive of the movement of a human subject during a physical activity session. IMU 158 generates inertial sensor data 602 during the physical activity session. The inertial sensor data 602 may include time series data including sensor data descriptive of movement for a plurality of time or sense intervals. Each IMU 158 can generate sensor data 602 continuously during a physical activity session and provide the sensor data to one or more local machine-learned motion determination models 161. The local motion determination model(s) can automatically detect and record sensor data in order to select a subset of sensor data corresponding to interesting motions during the physical activity session. The motion determination models 161 may be trained to identify interesting motions based on training data indicating a user's prior motions and selected physical activities. The model can detect these motions and record and/or flag the data for animation generation when the user completes the activity. The sensor node can discard or otherwise ignore sensor data that is not identified as corresponding to an interesting motion. For example, the sensor node may discard the sensor data without transmitting it to a remote computing device for further processing.

The local machine-learned motion determination model(s) 161 generate a set of local motion determinations 604. The local motion determinations can include the subset of sensor data identified for animation generation. Additionally or alternatively in some examples, the local machine-learned motion determination model 161 at a sensor node can generate predictions or inferences based on the sensor data. The prediction or inferences (e.g., classification of the sensor data as a particular motion) can be included in the set of local motion determinations in addition to or in place of the subset of sensor data identified by the machine-learned model.

The remote computing device(s) 106 includes one or more remote machine-learned animation models 163 configured to create an animated rendering of the user's motion during the physical activity session. The remote computing device can input the set of local motion determinations 604 to the remote animation model(s) 163. The remote animation model(s) 163 can generate a body motion profile 606 based on the sensor data indicative of user movements during the physical activity session. The body motion profile 606 can be used to generate one or more animated motion renderings 608 of the user's motion. For example, data may be generated that is descriptive of an animated display of a user-defined avatar according to the body motion profile. The motion renderings 608 can include an animated display of a movement of the human subject represented as the avatar. The motion rendering may include interpolated and/or interpreted motion in example embodiments. The remote animation model can generate an animated rendering of the avatar including the recognized, interpolated, and/or interpreted movements.

The second machine-learned model can recognize particular patterns in the sensor data that correspond to a subset of motions for which motion rendering 608 of the physical activity session will be generated. For instance, the second machine-learned model can be trained to recognize patterns that viewers find exciting or otherwise more interesting to view than other patterns. By way of example, the second machine-learned model may be trained to recognize certain patterns of interest for snow skiing. The second machine-learned model may be trained to recognize patterns of quick vertical changes (e.g., corresponding to a jump), repeated and rapid directional changes (e.g., turning or slaloming through moguls), high twisting activity followed by a stop (e.g., the skier crashed). The recognized patterns of interest can be rendered by the machine-learning system for the animated display of the physical activity. Importantly, these recognized patterns of interest may be rendered for the animated display while other patterns may be omitted from the display. Such a technique not only increases the viewer's interest in the rendered display, but can also reduce computing resources by reducing the amount of sensor data that is rendered in the animation.

Figure 8:
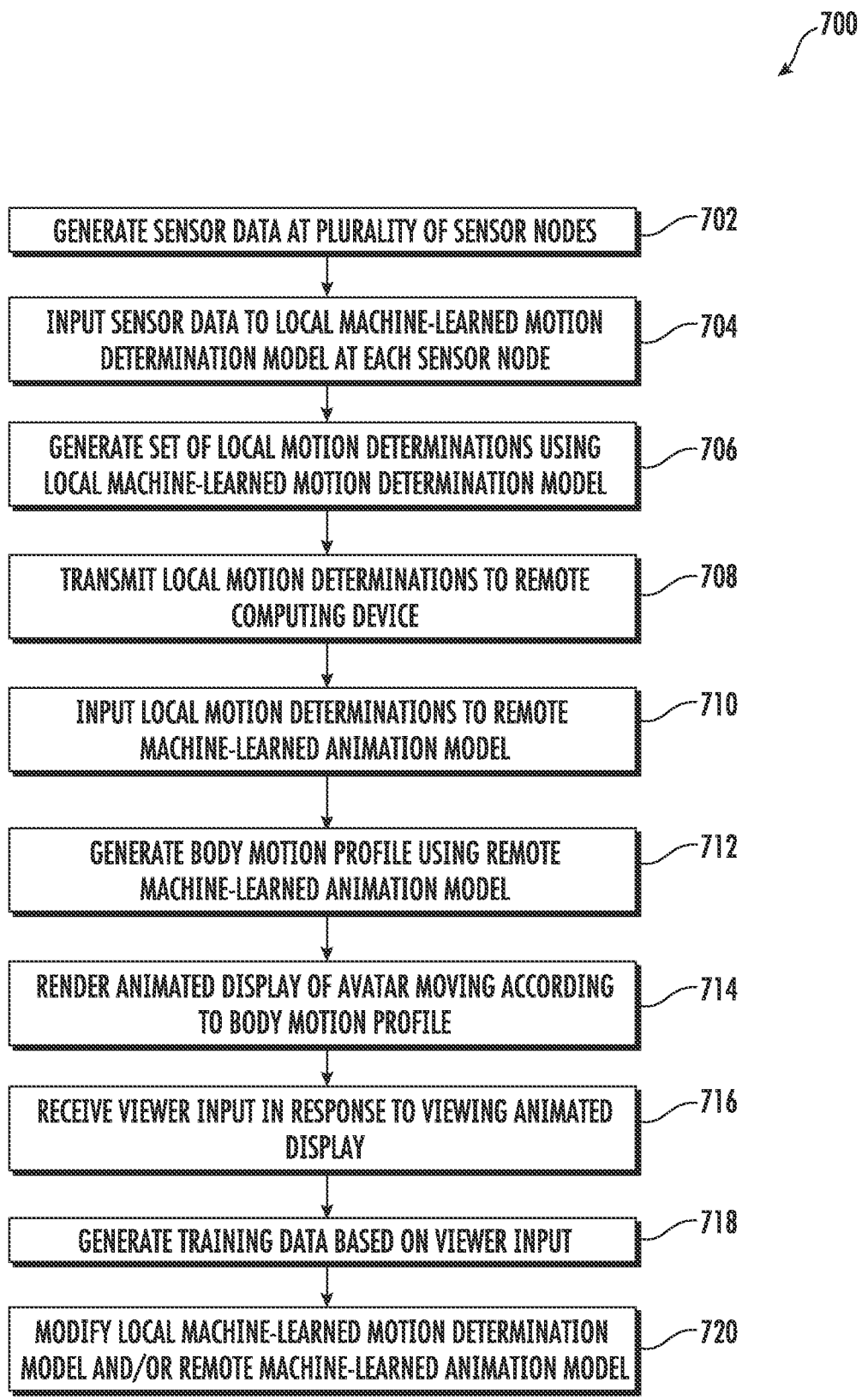
FIG. 8 depicts a flow diagram describing an example method for rendering animations of physical activity sessions using a machine-learning pipeline in accordance with example embodiments of the present disclosure.

FIG. 8 is a flowchart depicting an example method 700 of processing sensor data from a plurality of sensor nodes of one or more wearable devices to render an animated display of the motion of a human subject during a physical activity session in accordance with example embodiments of the present disclosure. One or more portions of method 700 can be implemented by one or more computing devices such as, for example, one or more computing devices of a computing environment 100 as illustrated in FIG. 1. One or more portions of method 700 can be implemented as an algorithm on the hardware components of the devices described herein to, for example, utilize a machine-learning system to process sensor data using one or more local machine-learned motion determination models at each of the sensor nodes and one or more remote machine-learned animation models at one or more remote computing devices. Although FIG. 8 depicts steps performed in a particular order for purposes of illustration and discussion, method 700 of FIG. 8 and methods 800 and 900 described hereinafter are not limited to the particularly illustrated order or arrangement. The various steps of the methods described herein can be omitted, rearranged, combined, and/or adapted in various ways without deviating from the scope of the present disclosure.

At 702, method 700 includes generating sensor data at a plurality of sensor nodes of one or more wearable devices. The sensor data may include movement data (e.g., via one or more sensors such as the IMU(s), etc.) indicative of the movement of a respective portion of the human subject. The movement data, for example, can include one or more of velocity, acceleration, or positional information of the human subject. Such information can be indicative of a movement pattern of the human subject over a time period (e.g., a reception time period). By way of example, the movement data can indicate the position(s) and time(s) associated with the motion of the handheld interactive object(s). This data can be expressed as a series of coordinate point(s) (e.g., 2D x-y coordinates, etc.) and time(s) (e.g., time durations from a t0, timestamps associated with a world clock, etc. This data may also be expressed as three-dimensional motion data generated by the IMU for example.

At 704, method 700 includes inputting the sensor data to one or more local machine-learned motion determination models at the sensor node. The local motion determination model at each sensor node can process the sensor data to automatically flag a subset of the sensor data corresponding to interesting motions during the physical activity session. The local models can detect these motions and record the sensor data in local memory and/or flag the data for animation generation when the user completes the activity. The sensor node can discard, overwrite, or otherwise ignore sensor data that is not identified as corresponding to an interesting motion. For example, the sensor node may discard the sensor data without transmitting it to a remote computing device for further processing.

At 706, method 700 includes generating a set of local motion determinations at each sensor node using the local motion determination model(s). In some examples, the local motion determinations include the subset of sensor data identified for animation generation. Additionally or alternatively, the local motion determinations may include predictions or inferences based on the sensor data. The inferences (e.g., classification of the sensor data as a particular motion) can be included in the set of local motion determinations in addition to or in place of the subset of sensor data identified by the machine-learned model.

At 708, method 700 includes transmitting the set of local motion determinations from each sensor node to one or more remote computing devices. The local motion determinations may be transmitted over one or more wired and/or wireless connections. In some embodiments, step 708 may be performed at the conclusion of the physical activity session. For example, after completing an activity session, the sensor node may be communicatively coupled to the remote computing device to transmit the set of local motion determinations. In other examples, step 708 may be performed during the physical activity session. For example, a sensor node may transmit portions of the local motion determinations as they are generated.

At 710, method 700 includes inputting the local motion determinations from each sensor node to one or more remote machine-learned animation models. The remote animation model can process the local motion determinations to recognize patterns in the sensor data that are indicative of interesting movements that should be rendered in an animation.

At 712, method 700 includes generating a body motion profile from the recognized patterns in the sensor data using the remote animation model. The body motion profile may include data indicative of the recognized patterns in the sensor data describing movement of the human subject. The body motion profile describes the motion of the human subject according to the recognized patterns in the sensor data. The body motion profile directly maps raw sensor data from the set of local motion determinations to one or more motion renderings. The remote animation model can utilize a confidence value associated with individual predictions of user motion to map the sensor data to the motion renderings. For example, the model may render additional details when the model is very confident in a predicted motion. The model may increase interpolation and interpretation during moments when the model is less confident in a predicted motion. For example, in response to the confidence value satisfying one or more predetermined thresholds, the model can generate a detailed rendering of the animated display for a respective body motion sub-profile. In response to the confidence value failing to satisfy the one or more predetermined thresholds, the model can increase an interpolation value for generating the animated display from a respective portion of the body motion profile.

At 714, method 700 includes rendering an animated display of an avatar moving according to the body motion profile. Step 714 can include providing an animated display of the motion renderings that are generated according to the body motion profile.

At 716, method 700 includes receiving viewer input from a viewer in response to viewing the animated display. The viewer input may be provided by one or more input devices while viewing the animated display in example embodiments. The input may indicate a positive or negative response to particular portions of the animated display. By way of example, a viewer may provide a positive input indicating that they found a particular motion rendering exciting, interesting, or otherwise suitable for inclusion in the animated display of the activity session. Similarly, a viewer may provide a negative input indicating that they found a particular rendering unexciting, uninteresting, or otherwise not suitable for inclusion in the animated display of the activity session.

At 718, method 700 includes generating training data based on the viewer input in response to the animated display. In response to a viewer input, the system can identify the sensor data corresponding to the motion rendering for which the viewer input was received. For example, the system may identify the sensor data corresponding to a particular movement or trick that was displayed for the motion rendering. The sensor data corresponding to the rendered movement can be annotated with one or more labels indicating the sensor data as positive or negative training data. For example, the sensor data can be labeled to indicate that it corresponds to data that should or should not be recorded and rendered in an animated display.

At 720, method 700 includes modifying the local motion determination model(s) and/or the remote animation model(s) based on the training data. The training data can be used to train the machine-learned model(s) at the sensor nodes and/or the machine-learned models at the remote computing device. The sensor data can be input to the first machine-learned model and the resulting model predictions can be compared to the annotations to detect errors in the sensor data that is flagged for animation rendering. The first machine-learned model can be modified based on the training data. The sensor data can be input to the second machine-learned model and the selected animations can be compared to detect errors in the sensor data that was rendered in the animated display (e.g., as part of a highlight reel). The second machine-learned model can be modified based on the detected errors in determining which patterns of sensor data to animate. In some examples, the machine-learned system can be trained end-to-end by providing the training data to the local machine-learned motion determination model(s) and comparing the final output(s) of the remote machine-learned animation models to the labels. Modifications to the local motion determination model and/or the remote animation model can be made based on detected errors.

Figure 9:
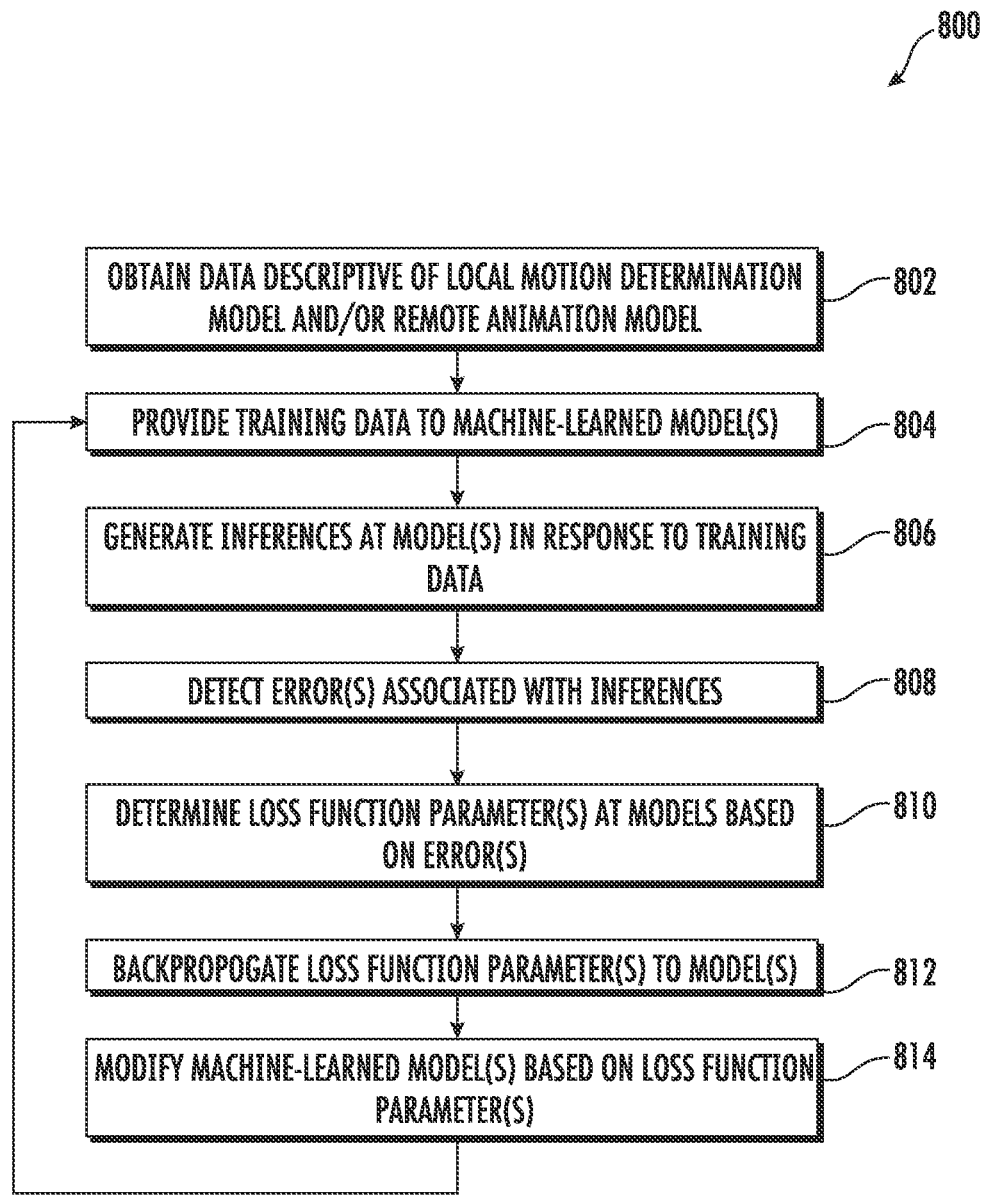
FIG. 9 depicts a flow diagram describing an example method training a machine-learning pipeline in accordance with example embodiments of the present disclosure.

FIG. 9 is a flowchart depicting an example method 800 of training a machine-learning system including a local machine-learned motion determination model and/or a remote machine-learned animation model. One or more portions of method 800 can be implemented by one or more computing devices such as, for example, one or more computing devices of a computing environment 100 as illustrated in FIG. 1. One or more portions of method 800 can be implemented as an algorithm on the hardware components of the devices described herein to, for example, train a machine-learning system to process sensor data using one or more local motion determination models at each of the sensor nodes and/or one or more remote animation models at one or more remote computing devices.

At 802, data descriptive of a local machine-learned motion determination model and/or a remote machine-learned animation model is obtained. In some examples, method 800 may be performed to train one or more local determination models. In other examples, method 800 may be performed to train one or more remote animation models. In yet other examples, method 800 may be performed to train both a local determination model and a remote animation model.

At 802, method 800 includes obtaining training data for training a machine-learned model. The training data can be generated in response to user input received from a user viewing an animated display of previously rendered sensor data. A viewer of the animated display may provide a positive response to a rendered movement, such as an input indicating that a particularly rendered movement is exciting. Additionally or alternatively, a viewer of the animated display may provide a negative response to the rendered movement, such as an input indicating that the particular movement is not exciting or was not desirable for view in the animated rendering. The sensor data corresponding to the rendered movement can be annotated with one or more labels indicating the sensor data as positive or negative training data. In some examples, the training data may include or otherwise be based on sensor data associated with a particular user in order to generate a user-dependent personalized model.

At 804, method 800 includes providing the training data to the machine-learned model. At 806, method 800 includes generating one or more inferences at the machine-learned model in response to the sensor data. For a local motion determination model, the inference may include an identification of sensor data that is to be used by a remote animation model for rendering animations. In some examples, the inference may alternatively or additionally include one or more motion predictions based on the sensor data. For a remote animation model, the inference at 806 may include a predicted user motion based on the detected sensor data.

At 808, method 800 includes detecting one or more errors associated with the inference(s). For example, the model trainer may detect an error with respect to a generated inference, such as that sensor data that should have been identified for animation generation by the local animation model was not identified. A detected error may also include detecting that sensor data was identified that should not have been identified. The model trainer may detect errors with respect to the animation model including errors in the predicted motions of the human subject or errors with respect to which predicted motions are included an animated display such as a highlight video for a physical activity session.

At 810, method 800 includes back propagating one or more loss function parameters to the model. For example, a sub-gradient calculated for the model can be back propagated to the model.

At 812, one or more portions of the machine-learned model can be modified based on the backpropagation at 814. In some examples, the machine-learned model may be modified based on backpropagation of the loss function parameter. For example, one or more portions of the local motion determination model may be modified and/or one or more portions of the remote animation model may be modified.

Figure 10:
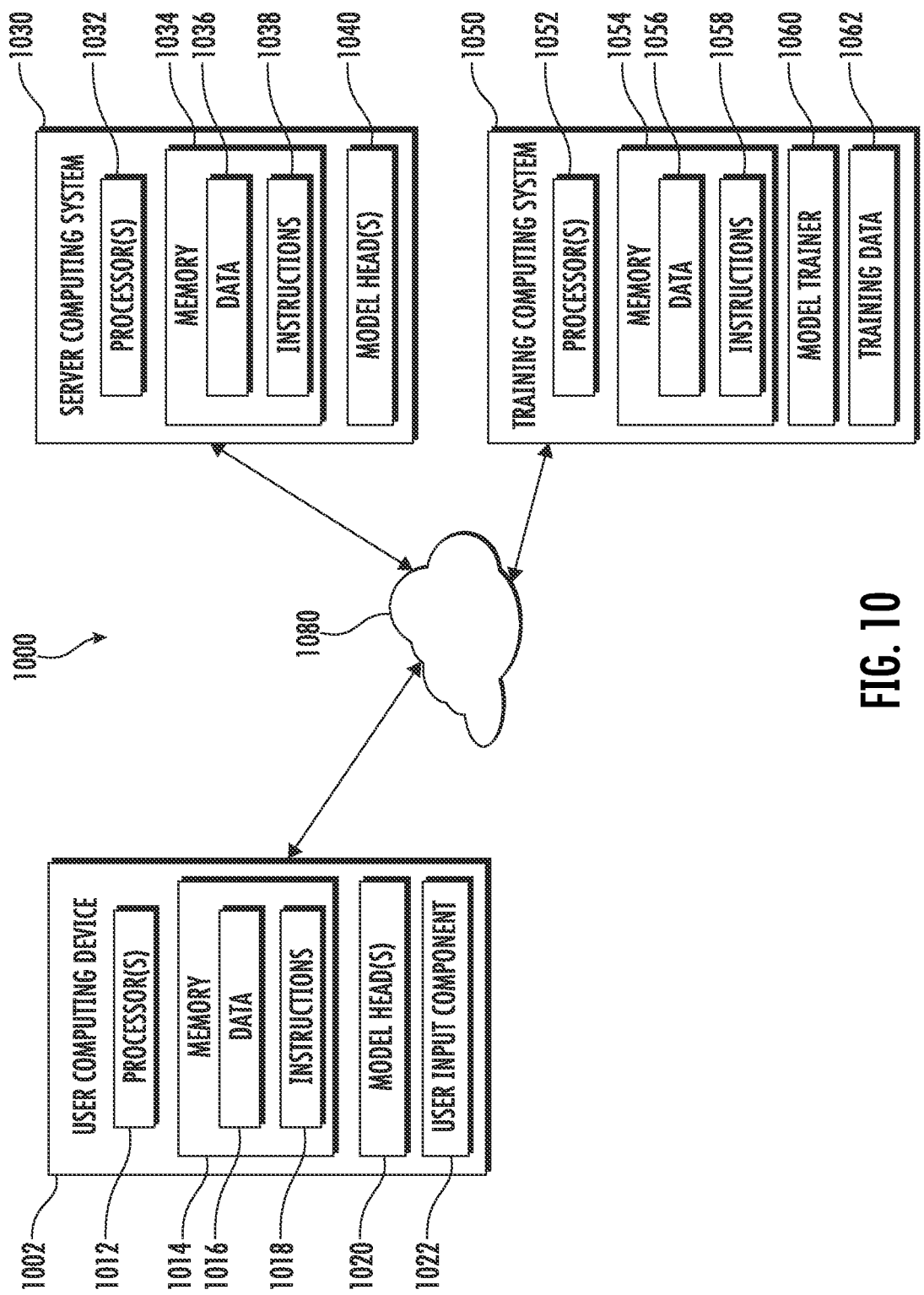
FIG. 10 depicts a block diagram of an example computing system for training and deploying a machine-learned model in accordance with example embodiments of the present disclosure.

FIG. 10 depicts a block diagram of an example computing system 1000 that can be used to implement any of the computing devices described herein. The computing system 1000 can include a user computing device 1002, a server computing system 1030, and/or a training computing system 1050 that are communicatively coupled over a network 1080.

The user computing device 1002 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage mediums, such as RAM, ROM, EEPROM, EPROM, flash memory devices, magnetic disks, etc., and combinations thereof. The memory 1014 can store data 1016 and instructions 1018 which are executed by the processor 1012 to cause the user computing device 1002 to perform operations.

The user computing device 1002 can include one or more portions of a machine-learned model 1020. In some implementations, the machine-learned model can store or include one or more portions of a local motion generation model and/or a remote animation model. For example, the machine-learned model can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. A local motion determination model may be configured to identify subsets of sensor data to be used for rendering animations by a remote animation model. A remote animation model may identify patterns of interest in sensor data and map those patterns to motion renderings using a body motion profile.

In some implementations, the machine-learned model can be received from the server computing system 1030 over network 1080, stored in the user computing device memory 1014, and then used or otherwise implemented by the one or more processors 1012. In some implementations, the user computing device 1002 can implement multiple parallel instances of the machine-learned model (e.g., to perform parallel inference generation across multiple instances of sensor data).

Additionally or alternatively to the machine-learned model 1020, the server computing system 1030 can include one or more machine-learned models 1040. The machine-learned model(s) 1040 can include a local motion determination model and/or remote animation model in example embodiments.

Additionally or alternatively to the machine learned models 1020, one or more machine learned models 1040 can be included in or otherwise stored and implemented by the server computing system 1030 that communicates with the user computing device 1002 according to a client-server relationship. For example, the machine learned models 1040 can be implemented by the server computing system 1030 as a portion of a web service (e.g., user movement recognition service). Thus, the machine learned models can be stored and implemented at the user computing device 1002 and/or at the server computing system 1030. The one or more machine learned models 1040 can be the same as or similar to the one or more machine learned models 1020.

The user computing device 1002 can also include one or more user input components 1022 that receive user input. For example, the user input component 1022 can be a touch-sensitive component (e.g., a capacitive touch sensor 102) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage mediums, such as RAM, ROM, EEPROM, EPROM, flash memory devices, magnetic disks, etc., and combinations thereof. The memory 1034 can store data 1036 and instructions 1038 which are executed by the processor 1032 to cause the server computing system 1030 to perform operations.

In some implementations, the server computing system 1030 includes or is otherwise implemented by one or more server computing devices. In instances in which the server computing system 1030 includes plural server computing devices, such server computing devices can operate according to sequential computing architectures, parallel computing architectures, or some combination thereof.

As described above, the server computing system 1030 can store or otherwise include one or more machine learned models 1040. Example machine-learned models include neural networks or other multi-layer non-linear models. Example neural networks include feed forward neural networks, deep neural networks, recurrent neural networks, and convolutional neural networks. One example model is discussed with reference to FIG. 4.

The user computing device 1002 and/or the server computing system 1030 can train the machine learned models 1020 and/or 1040 via interaction with the training computing system 1050 that is communicatively coupled over the network 1080. The training computing system 1050 can be separate from the server computing system 1030 or can be a portion of the server computing system 1030.

The training computing system 1050 includes one or more processors 1052 and a memory 1054. The one or more processors 1052 can be any suitable processing device (e.g., a processor core, a microprocessor, an ASIC, a FPGA, a controller, a microcontroller, etc.) and can be one processor or a plurality of processors that are operatively connected. The memory 1054 can include one or more non-transitory computer-readable storage mediums, such as RAM, ROM, EEPROM, EPROM, flash memory devices, magnetic disks, etc., and combinations thereof. The memory 1054 can store data 1056 and instructions 1058 which are executed by the processor 1052 to cause the training computing system 1050 to perform operations. In some implementations, the training computing system 1050 includes or is otherwise implemented by one or more server computing devices.

The training computing system 1050 can include a model trainer 1060 that trains a machine-learned model stored at the user computing device 1002 and/or the server computing system 1030 using various training or learning techniques, such as, for example, backwards propagation of errors. In other examples as described herein, training computing system 1050 can train a machine-learned model prior to deployment for provisioning of the machine-learned model at user computing device 1002 or server computing system 1030. The machine-learned model can be stored at training computing system 1050 for training and then deployed to user computing device 1002 and server computing system 1030. In some implementations, performing backwards propagation of errors can include performing truncated backpropagation through time. The model trainer 1060 can perform a number of generalization techniques (e.g., weight decays, dropouts, etc.) to improve the generalization capability of the models being trained.

In particular, the model trainer 1060 can train the machine learned models 1020 and 1040 based on a set of training data 1062. The training data 1062 can include, for example, a plurality of instances of sensor data, where each instance of sensor data has been labeled with ground truth inferences such as indications of whether the sensor data should be used for rendering animations, etc. For example, the label(s) for each training data can describe the sensor data indicating movement by the human subject. In some implementations, the labels can be manually applied to the training data by humans. In some implementations, the models can be trained using a loss function that measures a difference between a predicted inference and a ground-truth inference. In some implementations, the models can be trained using a combined loss function. The total loss can be backpropagated through the model.

In some implementations, if the user has provided consent, the training examples can be provided by the user computing device 1002. Thus, in such implementations, the machine learned model 1020 provided to the user computing device 1002 can be trained by the training computing system 1050 on user-specific data received from the user computing device 1002. In some instances, this process can be referred to as personalizing the model.

The model trainer 1060 includes computer logic utilized to provide desired functionality. The model trainer 1060 can be implemented in hardware, firmware, and/or software controlling a general purpose processor. For example, in some implementations, the model trainer 160 includes program files stored on a storage device, loaded into a memory and executed by one or more processors. In other implementations, the model trainer 1060 includes one or more sets of computer-executable instructions that are stored in a tangible computer-readable storage medium such as RAM hard disk or optical or magnetic media.

The network 1080 can be any type of communications network, such as a local area network (e.g., intranet), wide area network (e.g., Internet), or some combination thereof and can include any number of wired or wireless links. In general, communication over the network 1080 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 10 depicts a block diagram of an example computing device 1110 that performs according to example embodiments of the present disclosure. The computing device 1110 can be a user computing device or a server computing device.

The computing device 1110 includes a number of applications (e.g., applications 1 through N). Each application contains its own machine learning library and machine-learned model(s). For example, each application can include a machine-learned model. Example applications include a health or fitness application, text messaging application, an email application, a dictation application, a virtual keyboard application, a browser application, etc.

Figure 11:
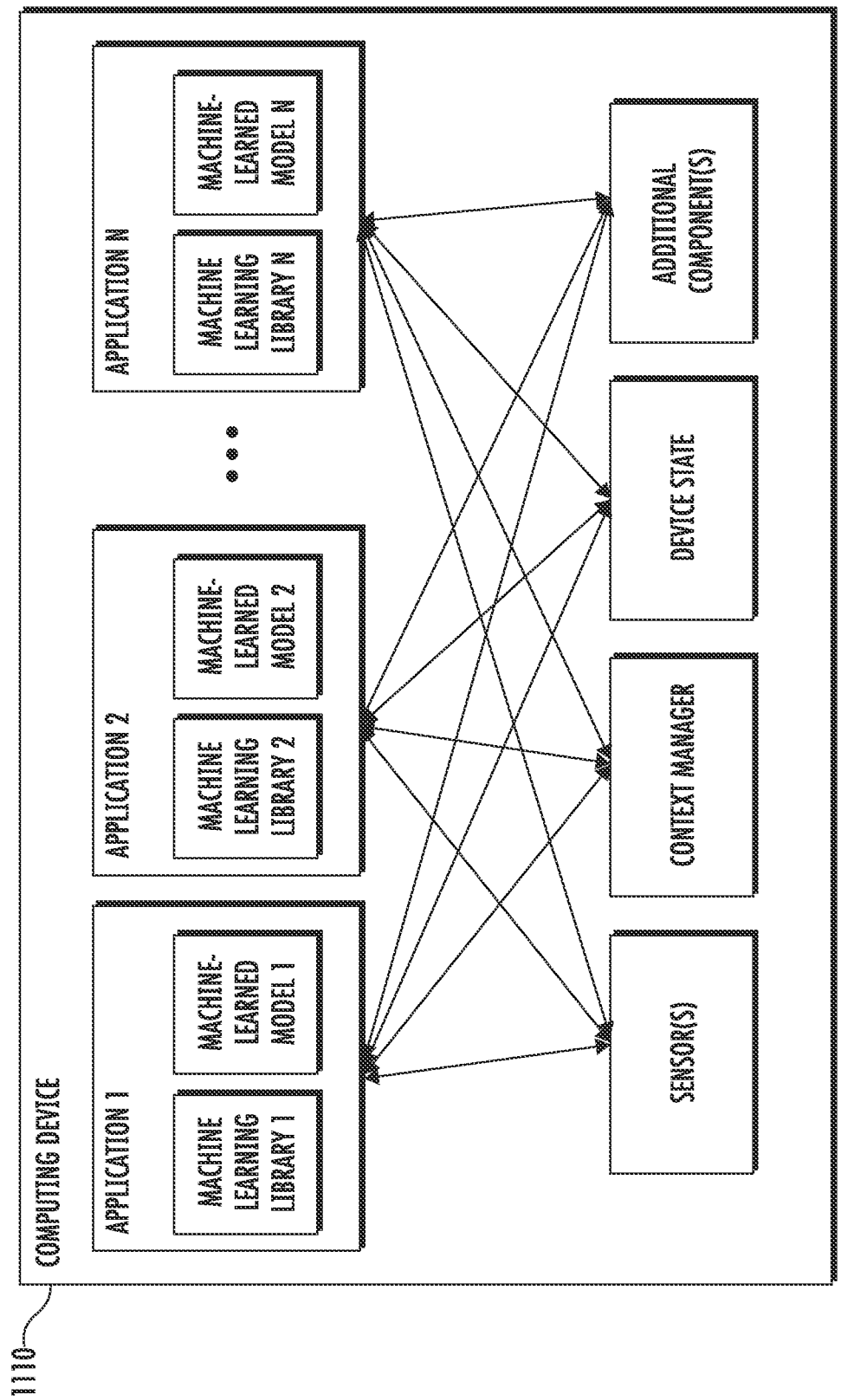
FIG. 11 depicts a block diagram of an example computing device that can be used to implement example embodiments in accordance with the present disclosure.

As illustrated in FIG. 11, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 12:
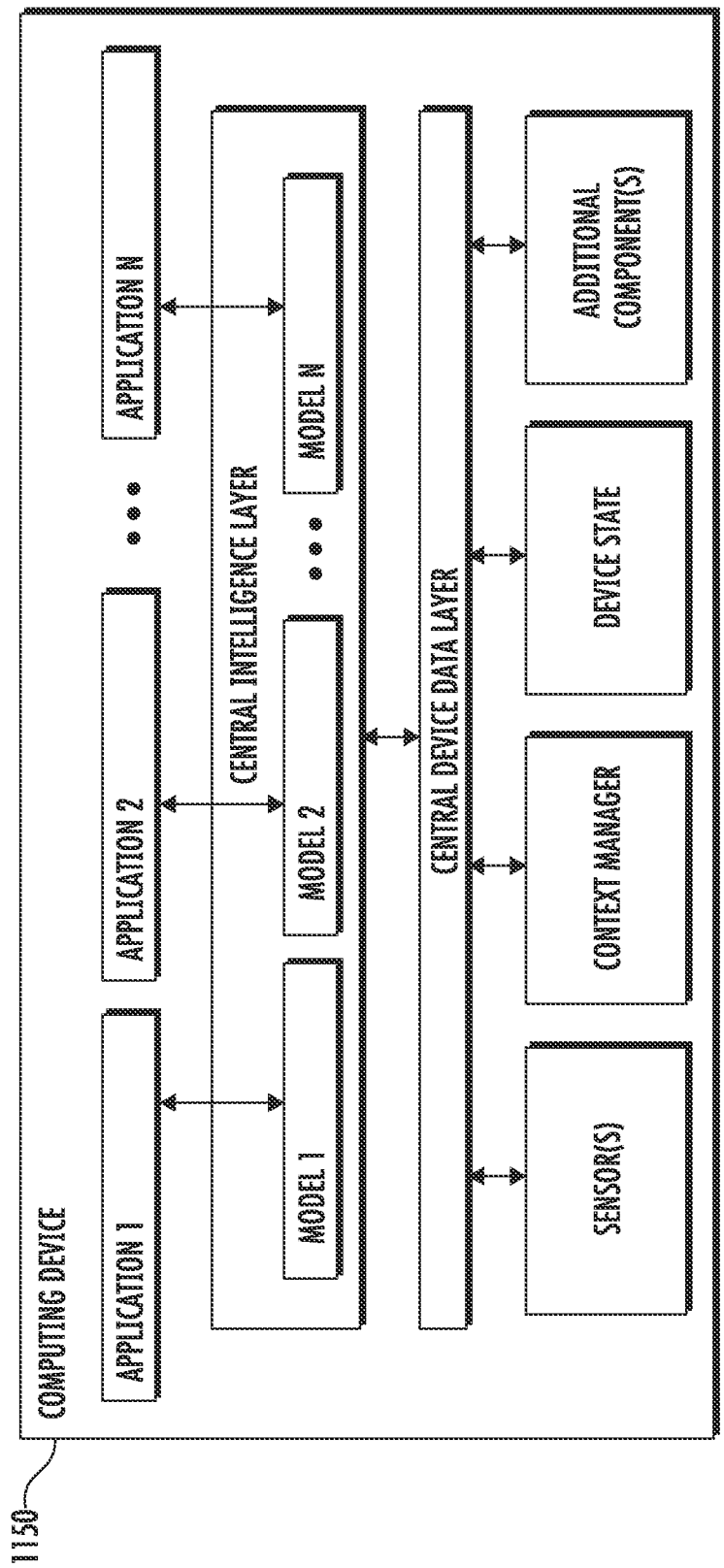
FIG. 12 depicts a block diagram of an example computing device that can be used to implement example embodiments in accordance with the present disclosure.

FIG. 12 depicts a block diagram of an example computing device 1150 that performs according to example embodiments of the present disclosure. The computing device 1150 can be a user computing device or a server computing device.

The computing device 1150 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 12, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 1150.

The central intelligence layer can communicate with a central device data layer. The central device data layer can be a centralized repository of data for the computing device 1150. As illustrated in FIG. 12, the central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for motion capture of human body movements, comprising:
    obtaining, at each of a plurality of sensor nodes coupled to respective portions of a human subject, inertial sensor data as the human subject engages in a physical activity session, each sensor node comprising at least one inertial measurement sensor, at least one processor, and at least one memory;
    processing, at each of the sensor nodes, the inertial sensor data according to a first machine-learned model to generate from the inertial sensor data a set of local motion determinations for animation generation after completion of the physical activity session;
    receiving, at one or more computing devices from each of the plurality of sensor nodes, the set of local motion determinations identified for animation generation;
    processing, at the one or more computing devices, the set of local motion determinations from each of the plurality of sensor nodes according to a second machine-learned model to generate a body motion profile corresponding to the physical activity session;
    providing, by the one or more computing devices for display to at least one viewer, an animated display of an avatar moving according to the body motion profile;
    labeling the inertial sensor data corresponding to at least one animation according to an input received from the at least one viewer in response to viewing the animated display, the input indicating whether the at least one animation was of interest to the at least one viewer;
    generating, by the one or more computing devices, training data based at least in part on the input received from the at least one viewer in response to viewing the animated display, the training data comprising at least a portion of the inertial sensor data labeled according to the input from the at least one viewer; and
    modifying at least one of the first machine-learned model or the second machine-learned model based at least in part on the training data.

2. The method of claim 1, wherein processing, at each of the sensor nodes, the inertial sensor data according to the first machine-learned model comprises;
    identifying a first subset of the inertial sensor data for animation generation; and
    wherein the set of local motion determinations corresponding to the physical activity session includes the first subset of the inertial sensor data.

3. The method of claim 2, wherein processing, at each of the sensor nodes, the inertial sensor data according to the first machine-learned model comprises:

identifying a second subset of the inertial sensor data that is not to be rendered for the animated display of the physical activity session;

transmitting, from the plurality of sensor nodes to the one or more computing devices, the set of local motion determinations including the first subset of the inertial sensor data; and discarding or overwriting, by each sensor node, the second subset of the inertial sensor data.

4. The method of claim 1, wherein processing, at each of the sensor nodes, the inertial sensor data according to the first machine-learned model comprises:

generating a plurality of local inferences based on the inertial sensor data; and identifying a subset of the plurality of local inferences for animation generation;

wherein the set of local motion determinations corresponding to the physical activity session includes the subset of the plurality of local inferences.

5. The method of claim 1, wherein:

modifying at least one of the first machine-learned model or the second machine-learned model based at least in part on the training data comprises modifying the first machine-learned model based on whether the at least one animation was of interest to the at least one viewer.

6. The method of claim 1, wherein:

modifying at least one of the first machine-learned model or the second machine-learned model based at least in part on the training data comprises modifying the second machine-learned model based on whether the at least one animation was of interest to the at least one viewer.

7. The method of claim 1, wherein processing, at the one or more computing devices, the set of local motion determinations from each of the sensor nodes according to the second machine-learned model comprises:

determining a confidence value associated with a plurality of predicted motions;

in response to the confidence value satisfying one or more predetermined thresholds, generating a detailed rendering of the animated display for a respective motion; and in response to the confidence value failing to satisfy the one or more predetermined thresholds, increasing an interpolation value of a motion rendering of the respective motion.

8. A system for motion capture of human body movements, comprising:

a plurality of sensor nodes configured for coupling to respective portions of a human subject, each sensor node comprising at least one processor, at least one memory, and at least one inertial measurement sensor configured to generate inertial sensor data as the human subject engages in a physical activity session, the at least one processor at each sensor node configured to process the inertial sensor data according to a first machine-learned model to generate from the inertial sensor data a set of local motion determinations for animation generation after completion of the physical activity session;

one or more computing devices configured to:

receive, from each of the plurality of sensor nodes, the set of local motion determinations identified for animation generation;

process the set of local motion determinations from each of the plurality of sensor nodes according to a second machine-learned model to generate a body motion profile corresponding to the physical activity session;

provide for display to at least one viewer an animated display of an avatar moving according to the body motion profile;

label the inertial sensor data corresponding to at least one animation according to an input received from the at least one viewer in response to viewing the animated display, the input indicating whether the at least one animation was of interest to the at least one viewer;

generate training data based at least in part on the input received from the at least one viewer in response to viewing the animated display, the training data comprising at least a portion of the inertial sensor data labeled according to the input from the at least one viewer; and modify at least one of the first machine-learned model or the second machine-learned model based at least in part on the training data.

9. The system of claim 8, wherein the at least one processor at each sensor node is configured to process the inertial sensor data according to the first machine-learned model by:

identifying a first subset of the inertial sensor data for animation generation; and wherein the set of local motion determinations corresponding to the physical activity session includes the first subset of the inertial sensor data.

10. The system of claim 9, wherein the at least one processor at each sensor node is configured to process the inertial sensor data according to the first machine-learned model by:

identifying a second subset of the inertial sensor data that is not to be rendered for the animated display of the physical activity session;

transmitting, from the plurality of sensor nodes to the one or more computing devices, the set of local motion determinations including the first subset of the inertial sensor data; and discarding or overwriting, by each sensor node, the second subset of the inertial sensor data.

11. The system of claim 8, wherein:

the one or more computing devices are configured to modify at least one of the first machine-learned model or the second machine-learned model by modifying the first machine-learned model based on whether the at least one animation was of interest to the at least one viewer.

12. The system of claim 8, wherein:

the one or more computing devices are configured to modify at least one of the first machine-learned model or the second machine-learned model by modifying the second machine-learned model based on whether the at least one animation was of interest to the at least one viewer.

13. The system of claim 8, wherein the one or more computing devices are configured to process the set of local motion determinations from each of the sensor nodes according to the second machine-learned model by:

determining a confidence value associated with a plurality of predicted motions;

in response to the confidence value satisfying one or more predetermined thresholds, generating a detailed rendering of the animated display for a respective motion; and in response to the confidence value failing to satisfy the one or more predetermined thresholds, increasing an interpolation value for generating the animated display from a respective motion.

14. One or more non-transitory computer-readable media comprising instructions that when executed by one or more computing devices cause the one or more computing devices to perform operations comprising:
   obtaining, at each of a plurality of sensor nodes coupled to respective portions of a human subject, inertial sensor data as the human subject engages in a physical activity session, each sensor node comprising at least one inertial measurement sensor, at least one processor, and at least one memory;
   processing, at each of the sensor nodes, the inertial sensor data according to a first machine-learned model to generate from the inertial sensor data a set of local motion determinations for animation generation after completion of the physical activity session;
   receiving, at one or more computing devices from each of the plurality of sensor nodes, the set of local motion determinations identified for animation generation;
   processing, at the one or more computing devices, the set of local motion determinations from each of the plurality of sensor nodes according to a second machine-learned model to generate a body motion profile corresponding to the physical activity session;
   providing, by the one or more computing devices for display to at least one viewer, an animated display of an avatar moving according to the body motion profile;
   labeling, by the one or more computing devices, the inertial sensor data corresponding to at least one animation according to an input received from the at least one viewer in response to viewing the animated display, the input indicating whether the at least one animation was of interest to the at least one viewer;
   generating, by the one or more computing devices, training data based at least in part on the input received from the at least one viewer in response to viewing the animated display, the training data comprising at least a portion of the inertial sensor data labeled according to the input from the at least one viewer; and
   modifying at least one of the first machine-learned model or the second machine-learned model based at least in part on the training data.

15. The one or more non-transitory computer-readable media of claim 14, wherein processing, at each of the sensor nodes, the inertial sensor data according to the first machine-learned model comprises;
   identifying a first subset of the inertial sensor data for animation generation; and
   wherein the set of local motion determinations corresponding to the physical activity session includes the first subset of the inertial sensor data.

16. The one or more non-transitory computer-readable media of claim 15, wherein processing, at each of the sensor nodes, the inertial sensor data according to the first machine-learned model comprises:
   identifying a second subset of the inertial sensor data that is not to be rendered for the animated display of the physical activity session;
   transmitting, from the plurality of sensor nodes to the one or more computing devices, the set of local motion determinations including the first subset of the inertial sensor data; and
   discarding or overwriting, by each sensor node, the second subset of the inertial sensor data.

17. The one or more non-transitory computer-readable media of claim 14, wherein processing, at the one or more computing devices, the set of local motion determinations from each of the sensor nodes according to the second machine-learned model comprises:
   determining a confidence value associated with a plurality of predicted motions;
   in response to the confidence value satisfying one or more predetermined thresholds, generating a detailed rendering of the animated display for a respective motion; and
   in response to the confidence value failing to satisfy the one or more predetermined thresholds, increasing an interpolation value for generating the animated display from a respective motion.

\* \* \* \* \*